US011221552B2

(12) United States Patent
Arai et al.

(10) Patent No.: US 11,221,552 B2
(45) Date of Patent: Jan. 11, 2022

(54) LIGHT SOURCE DEVICE, PROJECTOR, AND LIGHTING DEVICE

(71) Applicant: MAXELL, LTD., Kyoto (JP)

(72) Inventors: Masatoshi Arai, Kyoto (JP); Hiroshi Shiina, Kyoto (JP); Kentaro Sano, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/960,335

(22) PCT Filed: Nov. 12, 2018

(86) PCT No.: PCT/JP2018/041837
§ 371 (c)(1),
(2) Date: Jul. 7, 2020

(87) PCT Pub. No.: WO2019/150698
PCT Pub. Date: Aug. 8, 2019

(65) Prior Publication Data
US 2020/0371415 A1 Nov. 26, 2020

(30) Foreign Application Priority Data

Feb. 2, 2018 (JP) .............................. JP2018-017662
Sep. 13, 2018 (JP) .............................. JP2018-171613

(51) Int. Cl.
*G02B 26/00* (2006.01)
*G03B 21/16* (2006.01)
*G03B 21/20* (2006.01)

(52) U.S. Cl.
CPC ......... *G03B 21/204* (2013.01); *G02B 26/008* (2013.01); *G03B 21/16* (2013.01); *G03B 21/208* (2013.01)

(58) Field of Classification Search
CPC ........ G03B 21/20; G03B 21/16; G03B 21/14; G02B 26/00; F21S 2/00; F21V 29/00; F21V 9/10; F21V 9/16; F21Y 101/02
See application file for complete search history.

(56) References Cited

U.S. PATENT DOCUMENTS

2002/0003704 A1* 1/2002 Ohmae ................ H04N 9/3144
362/293
2004/0257538 A1 12/2004 Kondo et al.
(Continued)

FOREIGN PATENT DOCUMENTS

| CN | 1573530 A | 2/2005 |
| CN | 102591115 A | 7/2012 |

(Continued)

OTHER PUBLICATIONS

International Search of PCT/JP2018/041837 dated Jan. 22, 2019.
Chinese Office Action received in corresponding Chinese Application No. 201880073743.8 dated Apr. 6, 2021.

*Primary Examiner* — Michelle M Iacoletti
*Assistant Examiner* — Danell L Owens
(74) *Attorney, Agent, or Firm* — Mattingly & Malur, PC

(57) ABSTRACT

A light source device comprises: an excitation light source configured to generate excitation light; a wavelength conversion member including a base and a phosphor layer which is provided on the base and configured to convert the excitation light into fluorescence; and a converging optical system including a converging lens for converging the excitation light on the phosphor layer, wherein the light source device further comprises a housing for accommodating the wavelength conversion member, the excitation light source is provided outside the housing, a wall surface of the housing includes a lens hole into which the converging lens is inserted, and the converging lens which is inserted into the lens hole and the wall surface of the housing isolate an (Continued)

internal space of the housing from an outer space of the housing.

19 Claims, 19 Drawing Sheets

(56) References Cited

U.S. PATENT DOCUMENTS

| | | | |
|---|---|---|---|
| 2008/0049345 A1 | 2/2008 | Niwa et al. | |
| 2008/0079853 A1 | 4/2008 | Hwang et al. | |
| 2010/0034225 A1* | 2/2010 | Yagyu | H04N 9/3161 |
| | | | 372/34 |
| 2012/0080176 A1* | 4/2012 | Lee | F21V 29/74 |
| | | | 165/185 |
| 2012/0182530 A1 | 7/2012 | Lin et al. | |
| 2016/0077326 A1* | 3/2016 | Yamagishi | G02B 7/008 |
| | | | 353/61 |
| 2017/0192346 A1 | 7/2017 | Chikayama et al. | |
| 2017/0357150 A1 | 12/2017 | Ueda | |
| 2018/0173086 A1 | 6/2018 | Noda | |

FOREIGN PATENT DOCUMENTS

| | | |
|---|---|---|
| CN | 205003431 U | 1/2016 |
| CN | 206525066 U | 9/2017 |
| JP | 2001-296608 A | 10/2001 |
| JP | 2008-052176 A | 3/2008 |
| JP | 2012-018762 A | 1/2012 |
| JP | 2012068528 A * | 4/2012 |
| JP | 2015-225213 A | 12/2015 |
| JP | 2016-066061 A | 4/2016 |
| JP | 2017-215563 A | 12/2017 |
| JP | 2017-219747 A | 12/2017 |
| JP | 2018-101089 A | 6/2018 |
| WO | 2017/008689 A1 | 1/2017 |

* cited by examiner

Where, it is defined that $$Re = \frac{D^2 \omega}{4\upsilon}$$

$$\varepsilon = \frac{2a}{D}$$

SHAPE REPRESENTED BY EQUATION (6)

FIG. 17

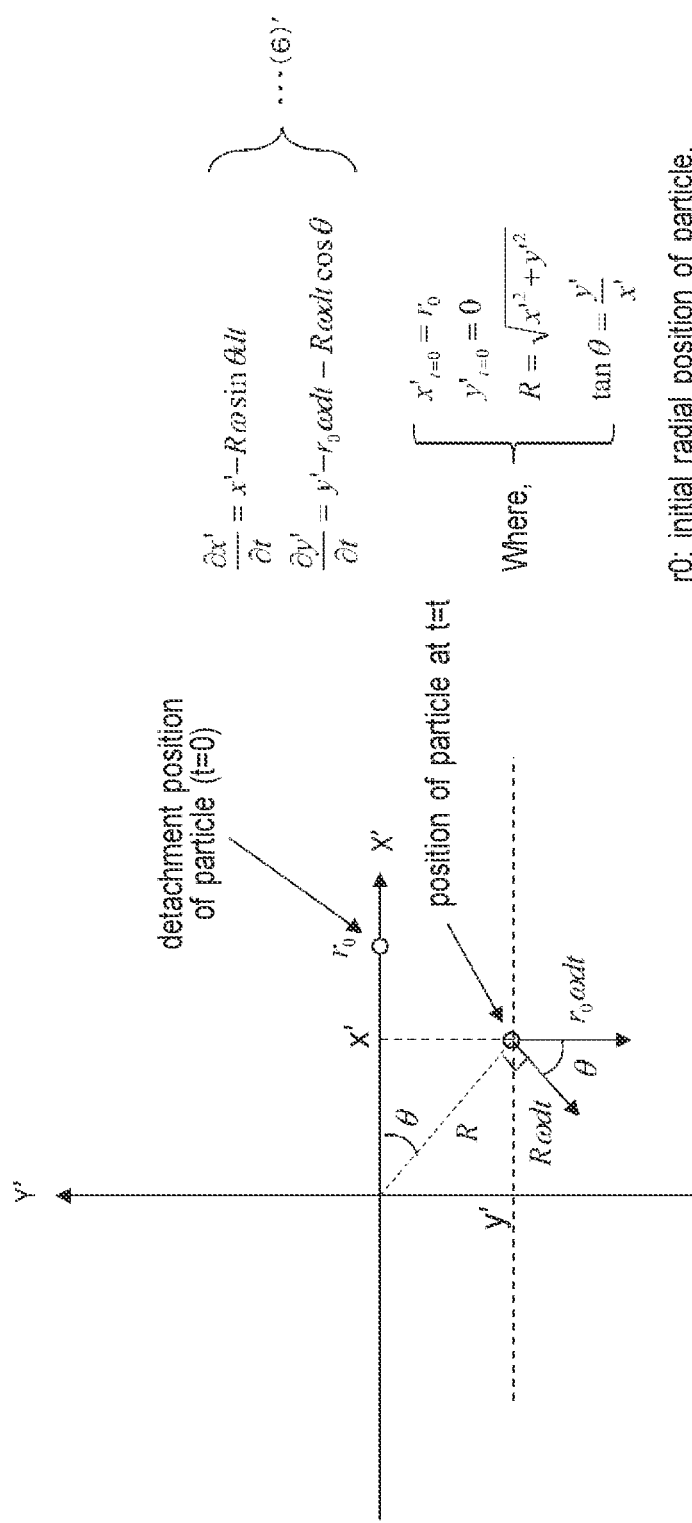

Particle detached from initial position (r0, 0) moves to coordinates (x', y') at certain time "t". Consider displacement of particle in coordinate system after elapse of short time "dt".

$$\begin{cases} \dfrac{\partial x'}{\partial t} = x' - R\omega \sin\theta dt \\ \dfrac{\partial y'}{\partial t} = y' - r_0 \omega dt - R\omega dt \cos\theta \end{cases} \quad \cdots (6)'$$

Where,
$$\begin{cases} x'_{t=0} = r_0 \\ y'_{t=0} = 0 \\ R = \sqrt{x'^2 + y'^2} \\ \tan\theta = \dfrac{y'}{x'} \end{cases}$$

r0: initial radial position of particle,
ω: rotational angular velocity of base 100a of phosphor wheel 100,
θ: rotation angle of phosphor wheel 100,
ψ: angle defined by tan ψ=r0ωt/r0 in stationary coordinate system when elapsed time is "t".

X-Y:Two-dimensional coordinate system on phosphor wheel 100
X'-Y':Two-dimensional coordinate system included in second facing surface 432a

LIGHT SOURCE DEVICE, PROJECTOR, AND LIGHTING DEVICE

TECHNICAL FIELD

The present invention relates to a light source device, and a projector and a lighting device using the same.

BACKGROUND ART

In the technical field to which the present invention belongs, there has been proposed a light source device configured to convert excitation light emitted from a solid state light source into visible light by using a phosphor so as to efficiently emit light. As one of examples, Patent Literature 1 discloses "a light source device comprises: a wavelength conversion member having a base which is rotatable about a predetermined rotation axis and a phosphor layer including a phosphor and provided on the base; a light source; a converging optical system configured to irradiate excitation light emitted from the light source so as to converge the excitation light on the phosphor layer; and a casing in which a sealed space for accommodating the wavelength conversion member is formed to be isolated from the outside (excerpted from Abstract)".

CITATION LIST

Patent Literature

Patent Literature: JP 2012-18762 A

SUMMARY OF INVENTION

Technical Problem

Since high temperature heat is generated when the excitation light is converted into fluorescence light on the phosphor layer, there is a demand to suppress increase in the temperature in the casing. With this regard, in the optical device described in Patent Literature 1, the casing accommodates the wavelength conversion member and the light source, and accordingly, there is a problem that in addition to the heat generated from the wavelength conversion member, the heat generated from the light source is further accumulated in the casing.

Furthermore, since the casing accommodates the wavelength conversion member and the light source, it increases in size and a unit formed by the casing which accommodates the wavelength conversion member and the light source becomes expensive. Accordingly, when either the wavelength conversion member or the light source malfunctions and is replaced by unit, there is a problem that the maintenance cost becomes expensive.

The present invention has been made in view of the problems mentioned above, and an objective thereof is to provide an optical device, a projector, and a lighting device configured to effectively process heat emitted from a wavelength conversion member.

Solution to Problem

In order to solve the problems above, the present invention is configured as described in the claims. According to one example of the present invention, a light source device comprising: an excitation light source configured to generate excitation light; a wavelength conversion member including a base and a phosphor layer which is provided on the base and configured to convert the excitation light into fluorescence; and a converging optical system including a converging lens for converging the excitation light on the phosphor layer, wherein the light source device further comprises a housing for accommodating the wavelength conversion member, the excitation light source is provided outside the housing, a first wall surface of the housing includes a lens hole into which the converging lens is inserted, and the converging lens which is inserted into the lens hole and a wall surface of the housing isolate an internal space of the housing from an outer space of the housing.

Advantageous Effects of Invention

According to the present invention, it is possible to provide an optical device, a projector, and a lighting device configured to effectively process heat emitted from a wavelength conversion member. The purposes, configurations, and advantageous effects of the present invention other than those described above will be clarified in the following description of the embodiments.

BRIEF DESCRIPTION OF DRAWINGS

FIG. 17 explains a position of a particle as viewed from a two-dimensional coordinate system included in a second facing surface.

DESCRIPTION OF EMBODIMENTS

Hereinafter, one of embodiments of the present invention will be described with reference to the drawings.

Figure 1:
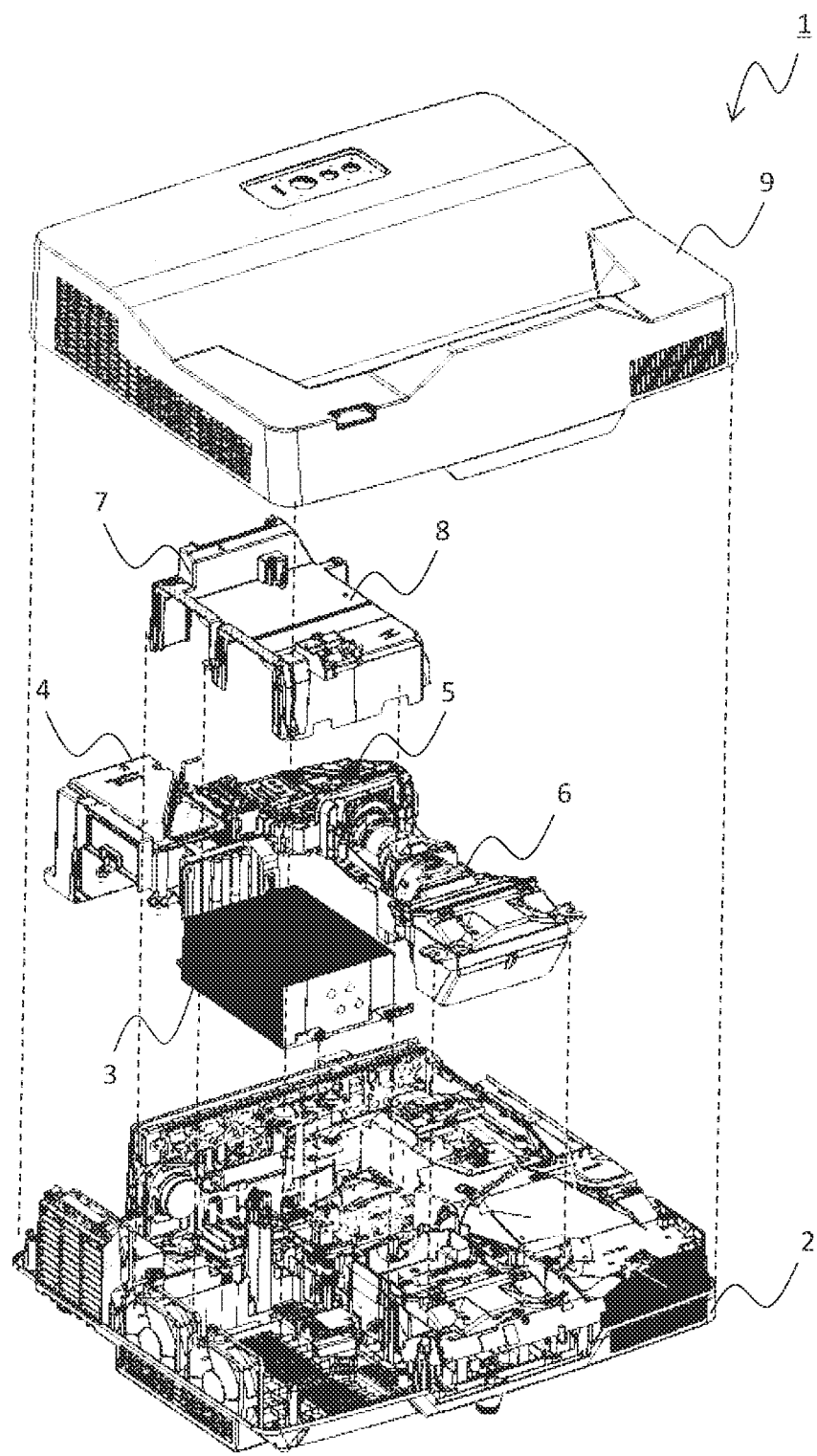
FIG. 1 is an exploded perspective view of a projector (projection type image display device).
Figure 2:
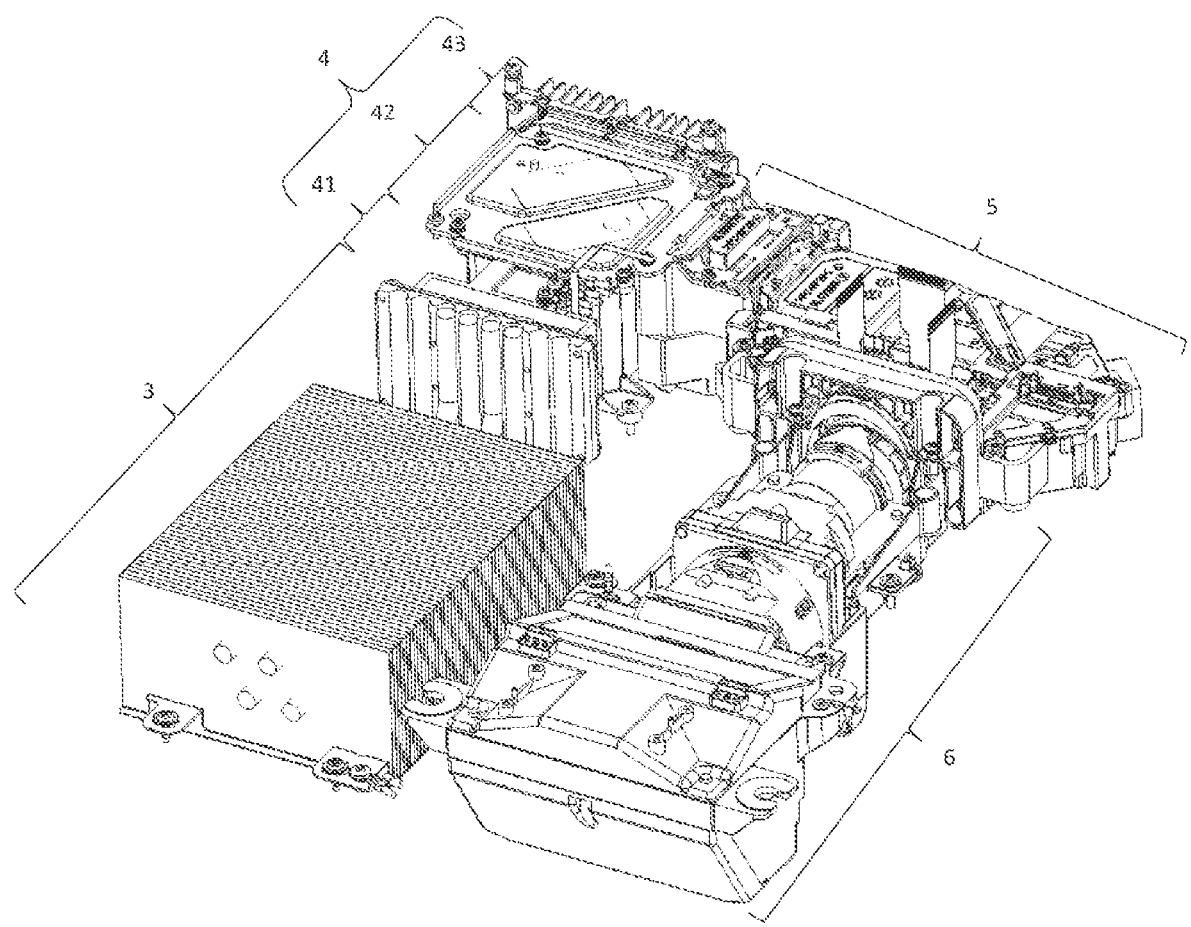
FIG. 2 is a schematic view of an optical engine.
Figure 3:
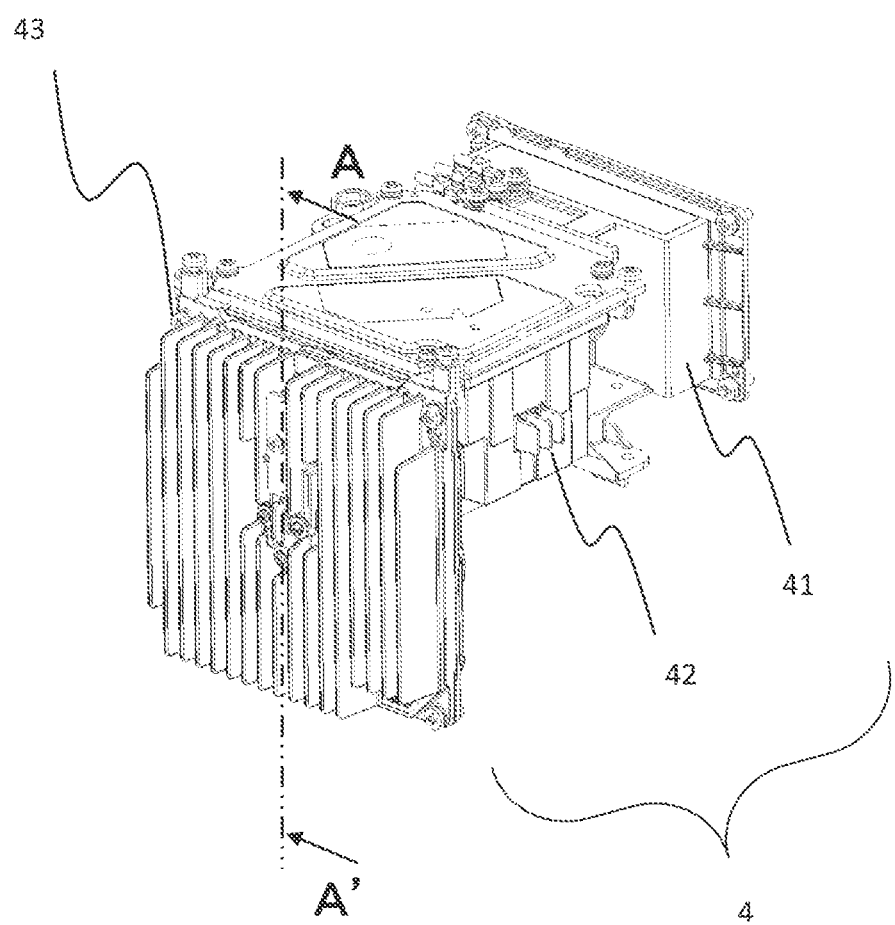
FIG. 3 is a schematic view illustrating a state in which a phosphor wheel housing and an optical engine are joined to each other.
Figure 4:
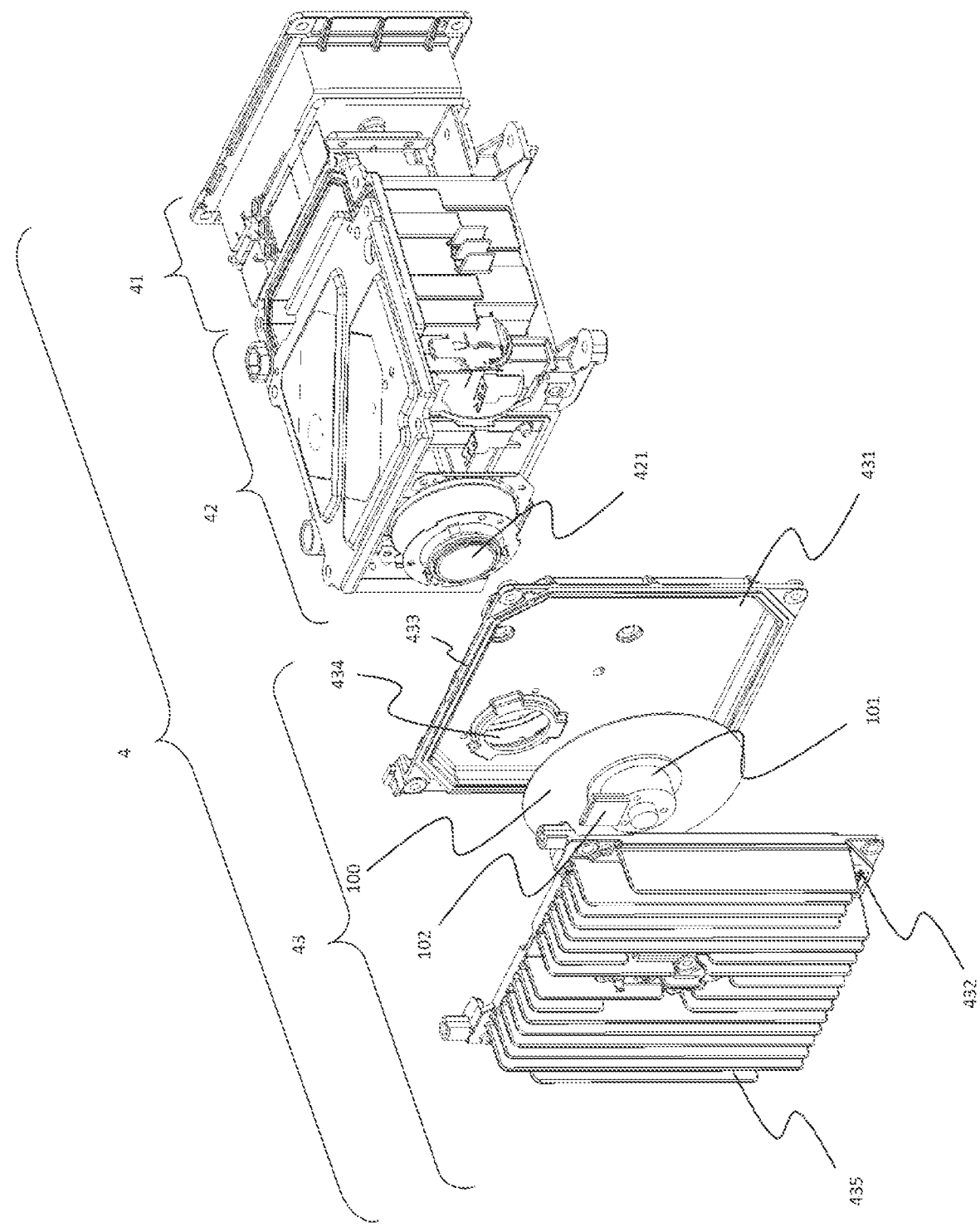
FIG. 4 is an exploded perspective view of a phosphor wheel housing.
Figure 5:
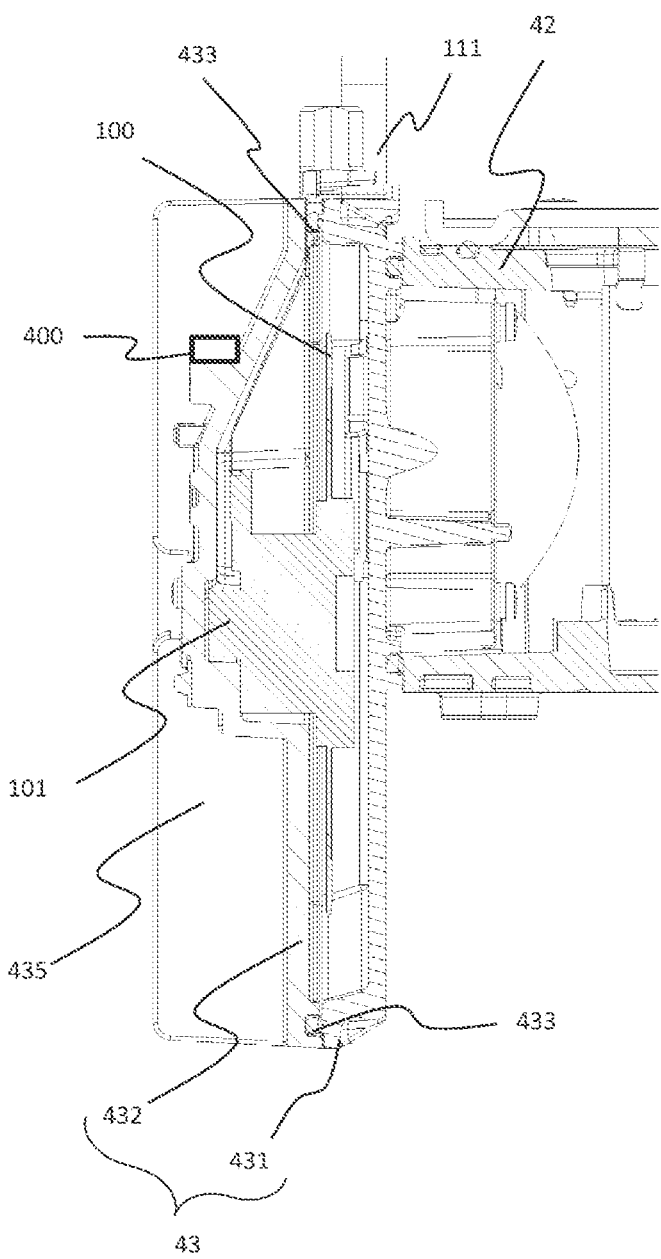
FIG. 5 is an A-A' cross-sectional view of a phosphor wheel housing.
Figure 6:
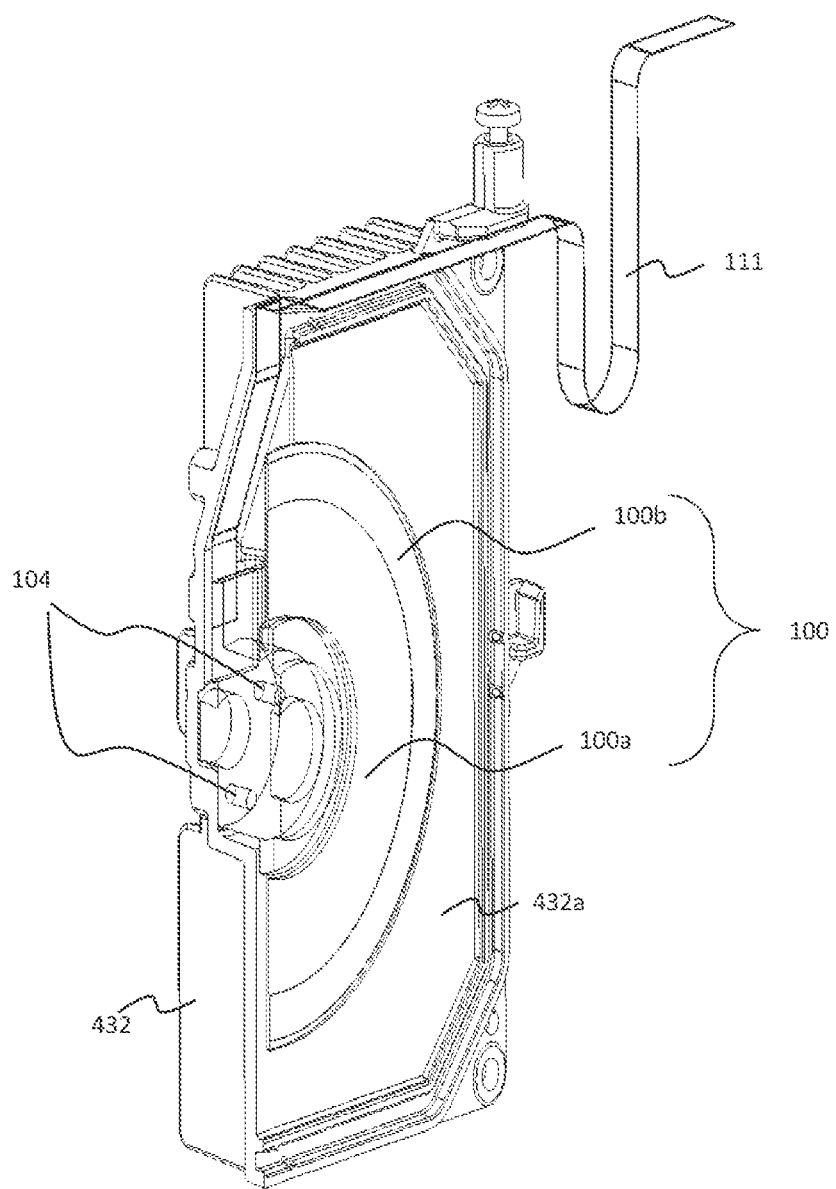
FIG. 6 explains a fixing structure of a phosphor wheel.

Hereinafter, a phosphor member according to the present embodiment and a projector on which a light source device using this phosphor member is mounted will be described with reference to FIGS. 1 to 6. FIG. 1 is an exploded perspective view of a projector (projection type image display device) 1. FIG. 2 is a schematic view of an optical engine 4. FIG. 3 is a schematic view illustrating a state in which a phosphor wheel housing 43 and the optical engine 4 are joined to each other. FIG. 4 is an exploded perspective view of the phosphor wheel housing 43. FIG. 5 is an A-A' cross-sectional view of the phosphor wheel housing 43. FIG. 6 explains a fixing structure of a phosphor wheel 100.

In the projector 1 illustrated in FIG. 1, a box-shaped bottom case 2 accommodates constituent elements of the projector 1, and an upper case 9 is placed over the bottom case 2.

The bottom case 2 accommodates a heat pipe 3, the optical engine 4 provided adjacent to the heat pipe 3, a panel optical system 5 configured to emit image light including image information displayed on a panel by using light emitted from the optical engine 4, and a projection optical system 6 including optical elements (a lens unit and a concave mirror) for magnifying and projecting the image light. An upper portion of the heat pipe 3 is covered with a duct cover 8 in which a cooling duct 7 is formed.

As illustrated in FIGS. 2 and 3, the optical engine 4 is installed in a state where a laser module housing 41, a color combining unit 42, and the phosphor wheel housing 43 are optically connected and arranged side by side.

The laser module housing 41 accommodates a laser light source 411 (see FIG. 12) configured to emit blue laser light (excitation light). A surface of the laser module housing 41 which is opposite to the color combining unit 42 faces the heat pipe 3, whereby heat generated from the laser light source 411 passes through a wall surface of the laser module housing 41 and is discharged to the outside of the laser module housing 41 so as to be air-cooled by the heat pipe 3.

The color combining unit 42 accommodates a dichroic mirror configured to transmit the excitation light and reflect fluorescence (yellow).

The phosphor wheel housing 43 accommodates a phosphor wheel 100 (see FIG. 4) configured to convert the excitation light transmitted through the color combining unit 42 into fluorescence. The phosphor wheel 100 corresponds to a wavelength conversion member.

As illustrated in FIG. 4 and FIG. 5, the phosphor wheel housing 43 includes a first housing part 431 facing the color combining unit 42 and a second housing part 432 located on the opposite side of the color combining unit 42. These parts are joined via a rubber packing 433 to form a hermetically sealed structure.

The second housing part 432 is provided with a thermometer 400 (see FIG. 5) configured to detect the temperature of an outer surface of the second housing part 432. Since an internal space of the phosphor wheel housing 43 according to the present embodiment is formed as a sealed space, a heat transfer path through which heat generated in the internal space radiates to an external space of the phosphor wheel housing 43 passes through the outer surface of the wall surface of the phosphor wheel housing 43. Accordingly, the temperature change in the internal space of the phosphor wheel housing 43 and the temperature change in the outer surface of the phosphor wheel housing 43 are highly correlated. Therefore, by increasing or decreasing the rotational speed of the phosphor wheel 100 or controlling the output of the laser light source 411 by using the measured temperature detected by the thermometer 400, it is possible to suppress the internal temperature in the phosphor wheel housing 43 from becoming too high. The control processing mentioned above will be described later.

The phosphor wheel housing 43 accommodates the phosphor wheel 100, a wheel motor 101 configured to rotate the phosphor wheel 100, and a motor board 102 in the order from the closest to the color combining unit 42. The motor board 102 is formed to be accommodated in a rectangular recess formed on an inner surface of the second housing part 432.

As illustrated in FIG. 6, the wheel motor 101 is fixed to the second housing part 432 via a flange (not illustrated) by bolts 104. The three pieces of bolts 104 are used at intervals of 120 degrees in the circumferential direction. FIG. 6 illustrates only the two pieces thereof for convenience of explanation.

The wheel motor 101 is fed with power via a flat cable 111. More specifically, a first end of the flat cable 111 is connected to the motor board 102 and a second end is connected to a processor 600 (see FIG. 12) of the projector 1. The wheel motor 101 is rotationally driven based on a control signal from the motor board 102, which rotates the phosphor wheel 100 at the rotational angular velocity co about a predetermined rotation axis.

As illustrated in FIG. 4, the first housing part 431 is provided with a lens hole 434 into which a converging lens 421 installed on a side surface of the color combining unit 42 facing the phosphor wheel housing 43. Since the color combining unit 42 includes the converging lens 421, it corresponds to a converging optical system.

By inserting the converging lens 421 into the lens hole 434, the color combining unit 42 and the phosphor wheel housing 43 are joined to each other, whereby the phosphor wheel housing 43 is sealed. In this way, the internal space of the phosphor wheel housing 43 is isolated from the outside of the phosphor wheel housing 43.

The outer surface of the second housing part 432 is provided with fins 435 which air-cool the wall surface of the phosphor wheel housing 43, so that the internal space of the phosphor wheel housing 43 is cooled. The fins 435 are one aspect of a cooling portion of the phosphor wheel housing 43, and instead of the fins 435, a concavo-convex shaped cooling plate may be formed in contact with the outer surface. The fins 435 and the concavo-convex shaped can increase the surface area of the outer surface of the second housing part 432 more than that in a flush state, thereby improving the heat dissipation efficiency to the external space of the phosphor wheel housing 43.

The phosphor wheel 100 includes a disk-shaped board (hereinafter referred to as "base") 100a and a ring-shaped phosphor layer 100b disposed on the base 100a (see FIG. 6). The phosphor layer 100b includes a functional film configured to convert the excitation light incident on the phosphor layer 100b into fluorescence and emit the fluorescence to the outside of the phosphor layer 100b. The material of the functional film is not particularly limited. For example, the phosphor layer 100b may be formed by sintered body area and air area. The sintered body area may contain phosphor particles and aluminum oxide (alumina). The phosphor particles are YAG or LAG.

Figure 7:
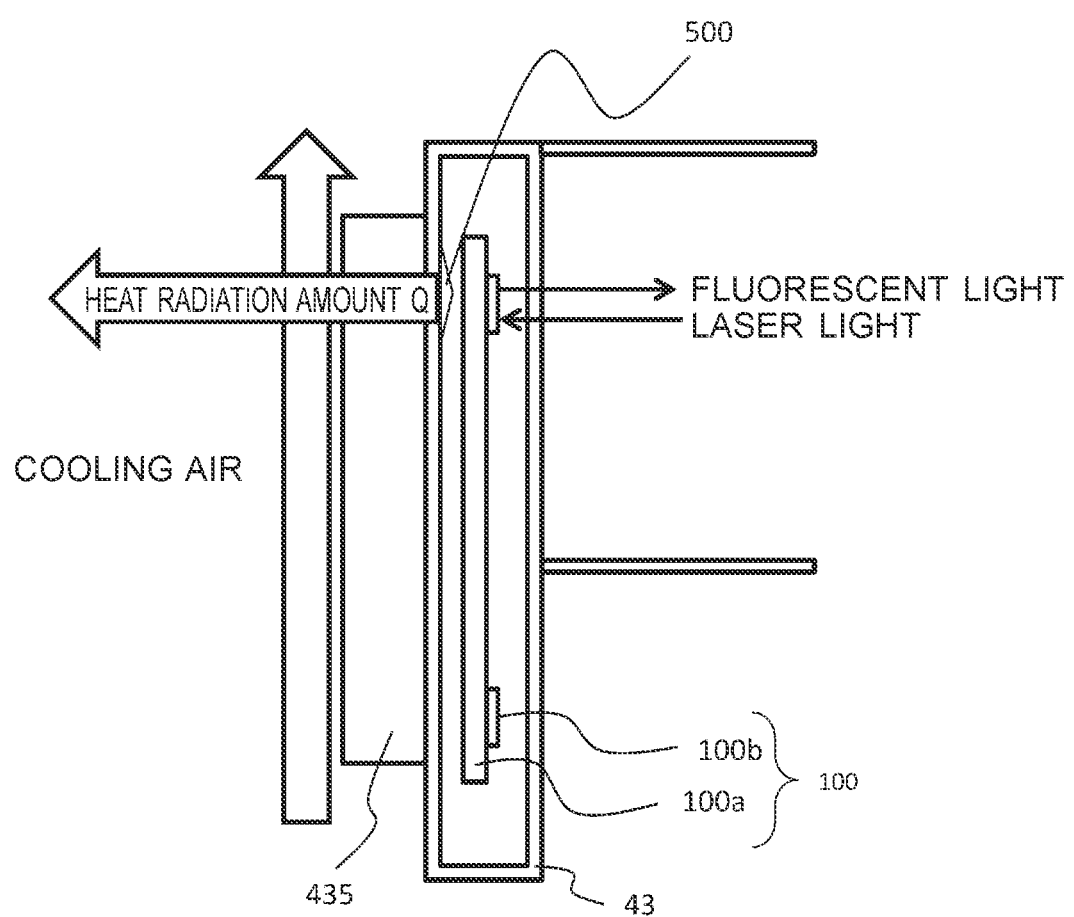
FIG. 7 explains operations and effects of a phosphor wheel housing according to the present embodiment.

With reference to FIG. 7, the technical features of the phosphor wheel housing 43 according to the present embodiment will be described. FIG. 7 explains operations and effects of the phosphor wheel housing 43 according to the present embodiment.

As illustrated in FIG. 7, the laser light (excitation light) passing through the color combining unit 42 enters the phosphor wheel housing 43, and then the phosphor layer 100b of the phosphor wheel 100 converts the laser light into fluorescence. When the laser light is converted into the fluorescence, heat is generated. This heat is transferred to the internal air which stays in the internal space of the phosphor wheel housing 43. The heated internal air is contact with an inner surface of the first housing part 431 and that of the second housing part 432, and the heat therein is radiated to the outside of the phosphor wheel housing 43 through heat transfer paths including a path from the inner surface to the outer surface of the first housing part 431, a path from the inner surface to the outer surface of the second housing part 432, and the fins 435. The heat radiation amount is defined as Q.

When the temperature in the phosphor wheel housing 43 becomes high, the conversion efficiency to the fluorescence decreases. Accordingly, it is necessary to increase the heat radiation amount Q of the phosphor wheel housing 43.

Therefore, in order to improve the heat radiation performance, the phosphor wheel housing 43 is configured to apply cooling air to the fins 435.

Hereinafter, with reference to FIG. 8A, FIG. 8B, FIG. 9A, and FIG. 9B, technical features for improving the cooling performance of the phosphor wheel housing 43 will be described.

Figure 8A:
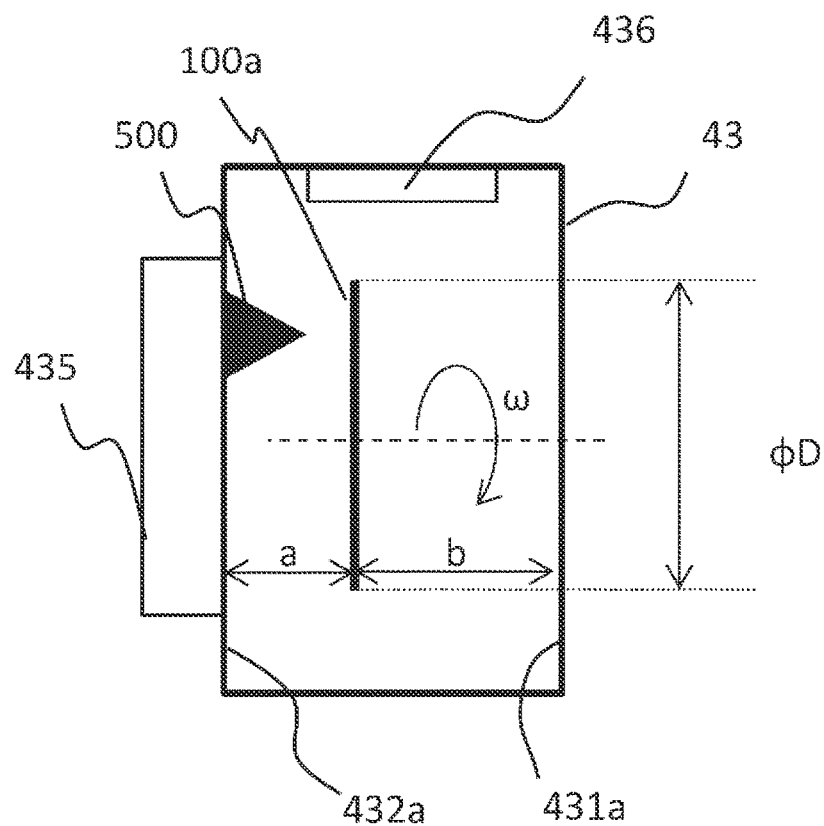
FIG. 8A illustrates an accommodation position of a phosphor wheel, rotational angular velocity of a phosphor wheel, and an installation position of a projection within a phosphor wheel housing.

FIG. 8A illustrates an accommodation position of the phosphor wheel 100, the rotational angular velocity co of the phosphor wheel 100, and an installation position of a projection 500 within the phosphor wheel housing 43. As illustrated in FIG. 8A, on a second facing surface 432a of the second housing part 432 which faces the base 100a, the projection 500 having the substantially polygonal pyramid shape of which an apex is located on the same axis as the optical axis of the laser light is formed. The projection 500 is fixed to the second facing surface 432a by surface contact, and is formed by the protruded shape protruding toward the base 100a. The projection 500 is preferably made of a material having the thermal conductivity higher than that of the air. In the present embodiment, from the point of view of thermal conductivity and strength, metal materials such as aluminum, magnesium, and iron are used for the first housing part 431 and the second housing part 432, and these materials are also used for forming the projection 500.

Since the projection 500 is formed in the substantially polygonal pyramid shape, even if the phosphor wheel 100 melts at high temperature and the laser light penetrates the phosphor wheel 100, the projection 500 can reflect and diffuse the laser light to prevent the laser light from being directly irradiated on one point of the second facing surface 432a.

Furthermore, the distance from the tip of the projection 500 to the base 100a is shorter than the distance from the second facing surface 432a. Since the projection 500 is formed by using a material having the thermal conductivity higher than that of the air, as compared with a case where the heat is transferred to the second facing surface 432a through the internal air, the heat can be more quickly transferred from the tip of the projection 500 to the second facing surface 432a through the projection 500. In addition, since the projection 500 is formed to be fixed to the second facing surface 432a by surface contact, an advantageous effect in which concentration of the high heat at one point of the second facing surface 432a is suppressed can be expected.

The projection 500 is one aspect of a heat absorbing portion, and as the projection 500, an inner side fin 436 or a concavo-convex shaped heat absorbing portion similar to this may be provided on an inner surface of the phosphor wheel housing 43. The heat absorbing portion is a member having the surface area larger than the surface area of the inner surface of the phosphor wheel housing 43, and is formed by using a material having the thermal conductivity higher than that of the air, for example, a metal material such as iron, aluminum, magnesium, and copper. By bonding the heat absorbing portion to the inner surface of the phosphor wheel housing 43, a heat transfer path is formed from the heat absorbing portion through the inner surface to the outer surface of the phosphor wheel housing 43. As a result, the heat in the internal space of the phosphor wheel housing 43 can be dissipated more quickly.

As illustrated in FIG. 8A, the distance from a surface of the base 100a of the phosphor wheel 100 facing the second housing part 432 to the second facing surface 432a is set as a first distance "a", and the distance from a surface of the base 100a of the phosphor wheel 100 facing the first housing part 431 to the first facing surface 431a of the first housing part 431 facing the base 100a is set as a second distance "b". Since the phosphor wheel 100 is a heating element in the phosphor wheel housing 43 (mainly the phosphor layer 100b generates heat and so does the wheel motor 101), it is preferable to set the first distance "a" to be shorter than the second distance "b" in order to transfer the heat to the fins 435 more efficiently, in other words, set the phosphor wheel 100 closer to the second facing surface 432a than the first facing surface 431a. For example, the first distance "a" may be set to equal to or less than 5.0 mm.

Figure 8B:
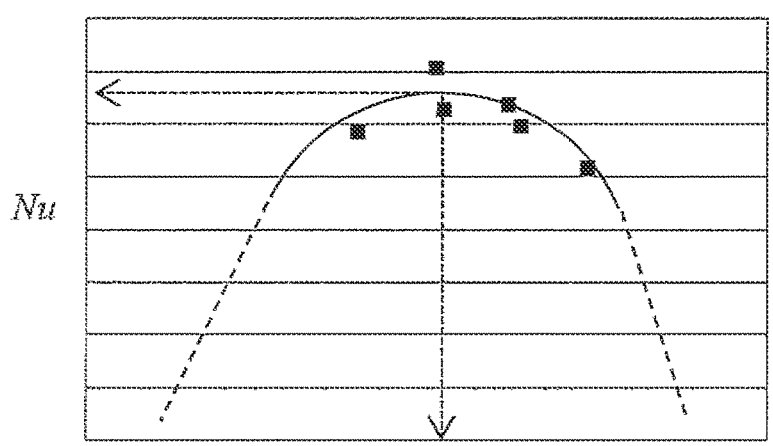
FIG. 8B illustrates a graph showing relationship between functions f (Re, ε) and average Nusselt numbers Nu.

With reference to FIG. 8B, as one of the technical features for enhancing the cooling effect, an example of adjusting the installation position of the phosphor wheel 100 within the phosphor wheel housing 43 and the rotational angular velocity co of the phosphor wheel 100 will be described. FIG. 8B illustrates a graph showing the relationship between functions f (Re, ε) including the Reynolds numbers "Re" and the clearance ratios "ε" and the average Nusselt numbers "Nu".

In the following, an example of installation positions of the second facing surface 432a and the phosphor wheel 100 will be described. As illustrated in FIG. 8B, in the graph in which the functions f (Re, ε) including the Reynolds numbers Re (see the expression (1)) and the clearance ratios ε (see the expression (2)) are plotted on the horizontal axis while the average Nusselt numbers Nu of the phosphor wheel 100 (see the expression (3)) are plotted on the vertical axis, the diameter D of the base 100a of the phosphor wheel 100 and the rotational angular velocity ω of the phosphor wheel 100 are set so as to fall within from the peak value Numax of the average Nusselt number Nu to a half value of the peak value Numax.

$$Re = \frac{D^2 \omega}{4\nu} \quad (1)$$

$$\varepsilon = \frac{2a}{D} \quad (2)$$

$$Nu = \frac{hD}{\lambda} \quad (3)$$

Where,
- ν: coefficient of kinematic viscosity of air,
- h: coefficient of heat transfer on surface, and
- λ: thermal conductivity of air.

Preferably, the average Nusselt number Nu and the function f (Re, ε) are determined by the following expression (4).

$$\left. \begin{array}{l} Nu = \dfrac{hD}{\lambda} = -2.0 \times 10^{-6} x^2 + 0.0147 x + 106 \\ x = f(Re, \varepsilon) = Re \times \varepsilon \end{array} \right\} \quad (4)$$

Since the larger average Nusselt number Nu is more preferable, the rotational angular velocity ω of the phosphor wheel 100 and the distance "a" of the phosphor wheel 100 are set so that the average Nusselt number Nu takes a maximum value. On the other hand, even when the average Nusselt number Nu is small, there is no immediate trouble. However, from the point of view of the life and reliability of a product, it is desirable that the average Nusselt number Nu satisfies the following relational expression (5).

$$Tm - Troom > \frac{4Q}{Nu \lambda \pi D} \quad (5)$$

Where,
- Tm: target temperature of phosphor wheel 100, and
- Troom: air temperature in phosphor wheel housing 43.

Figure 9A:
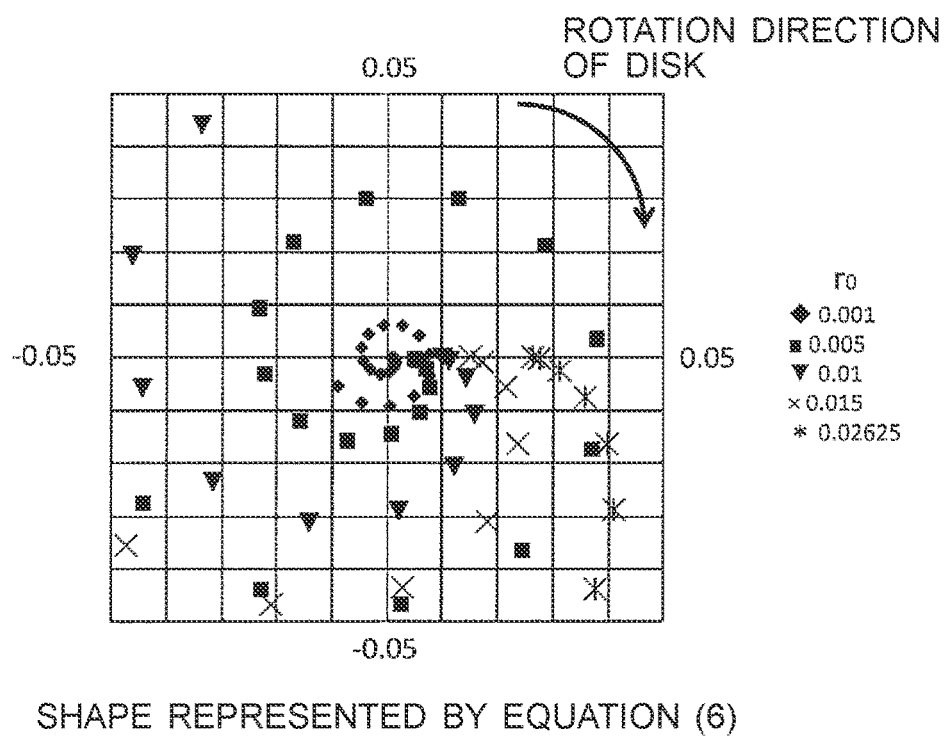
FIG. 9A illustrates an example of a concavo-convex shaped structure on an inner surface of a phosphor wheel housing.
Figure 9B:
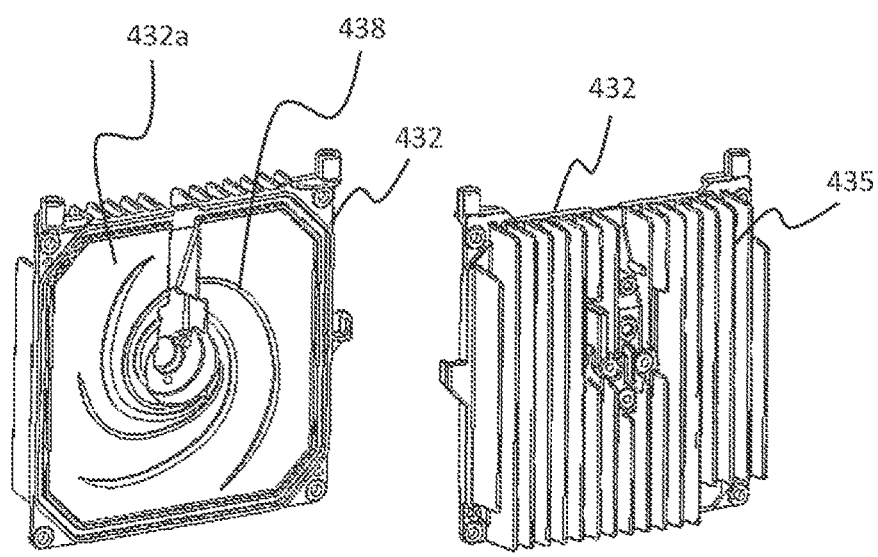
FIG. 9B illustrates an example in which a heat absorbing portion formed by a spiral shaped structural body illustrated in FIG. 9A is mounted on a phosphor wheel housing.

With reference to FIG. 9A and FIG. 9B, another example of the technical features for enhancing the cooling effect, in which the heat absorbing portion may be formed on the inner surface of the phosphor wheel housing 43, will be described. FIG. 9A illustrates an example of a concavo-convex shaped structure on the inner surface of the phosphor wheel housing 43. FIG. 9B illustrates an example in which the heat absorbing portion formed by a spiral-shaped structural body illustrated in FIG. 9A is mounted on the phosphor wheel housing 43.

The second facing surface 432a illustrated in FIG. 9A may include spiral-shaped concave portions or convex portions represented by the following expression (6) in order to enhance the heat absorbing performance of the second facing surface 432a.

$$\left. \begin{array}{l} X' = \sqrt{r_0^2 + (r_0 \omega t)^2} \, \cos(-\theta - \psi) \\ Y' = \sqrt{r_0^2 + (r_0 \omega t)^2} \, \sin(-\theta - \psi) \end{array} \right\} \quad (6)$$

Where,
- r0: initial radial position of particle,
  *Since particles can be present at each point of phosphor wheel and trajectories drawn thereby differ to each other depending on their initial positions, r0 needs to be defined,
- ω: rotational angular velocity of base 100a of phosphor wheel 100,
- θ: rotation angle of phosphor wheel 100,
  when elapsed time is "t", θ=ωt, and
- ψ: angle defined by tan ψ=r0ωt/r0 in stationary coordinate system when elapsed time is "t".

Figure 16:
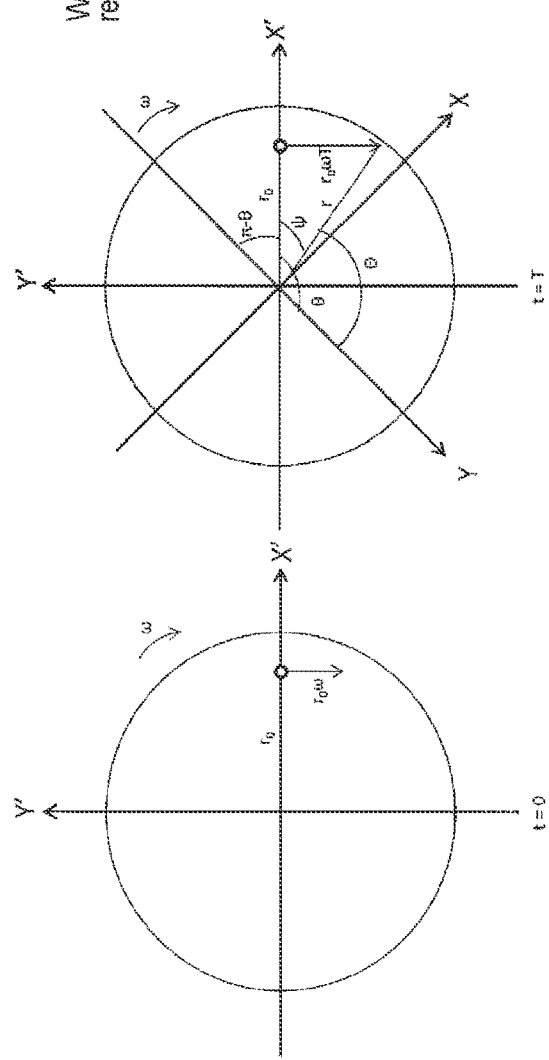
FIG. 16 explains a position of a particle as viewed from a base of a rotating phosphor wheel.

FIG. 16 explains a position of a particle as viewed from the phosphor wheel 100. The two-axis orthogonal coordinate system X'-Y' indicates a two-dimensional coordinate system included in the second facing surface 432a. In FIG. 16, when viewed from the two-axis coordinate system X'-Y', the particle detached from the phosphor wheel 100 moves straight immediately after detachment. Meanwhile, since the particle is dragged by the rotational flow on the phosphor wheel 100 with lapse of time, a streamlined trajectory is drawn thereby. The trajectory of the particle as viewed from the two-axis orthogonal coordinate system X'-Y' may be approximately represented by, for example, the expression (6). In addition, the trajectory of the particle as viewed from the two-axis orthogonal coordinate system X'-Y' may be represented as illustrated in the expression (6)' of FIG. 17 by using the displacement of the particle in a certain short time. FIG. 17 explains a position of a particle as viewed from the two-dimensional coordinate system included in the second facing surface.

$$\left. \begin{array}{l} \dfrac{\partial x'}{\partial t} = x' - R\omega \, \sin\theta dt \\ \dfrac{\partial y'}{\partial t} = y' - r_0 \omega dt - R\omega dt \, \cos\theta \end{array} \right\} \quad (6)'$$

Where,
$$x'_{t=0} = r_0$$
$$y'_{t=0} = 0$$
$$R = \sqrt{x'^2 + y'^2}$$
$$\tan\theta = \frac{y'}{x'}$$

- r0: initial radial position of particle,
- ω: rotational angular velocity of base 100a of phosphor wheel 100,
- θ: rotation angle of phosphor wheel 100, and
- ψ: angle defined by tan ψ=r0ωt/r0 in stationary coordinate system when elapsed time is "t".

The trajectories represented by expressions (6) and (6)' are simulations of the trajectories of particles floating in the internal air of the phosphor wheel housing 43 and in the air. Since the particles floating in the internal space serve as heat transfer medium, by forming the spiral-shape in accordance with the trajectories of the particles on the second facing surface 432a, the heat conductivity to the second facing surface 432a can be enhanced as well as the cooling effect by the fins 435 can be further enhanced. FIG. 9B illustrates an example in which the second facing surface 432a is provided with a spiral-shaped recess 438.

The first facing surface 431a may also be provided thereon with the spiral shape. On the other hand, the higher cooling effect can be expected when the second facing surface 432a which is closer to the fins 435 is provided with the spiral shape.

Figure 10:
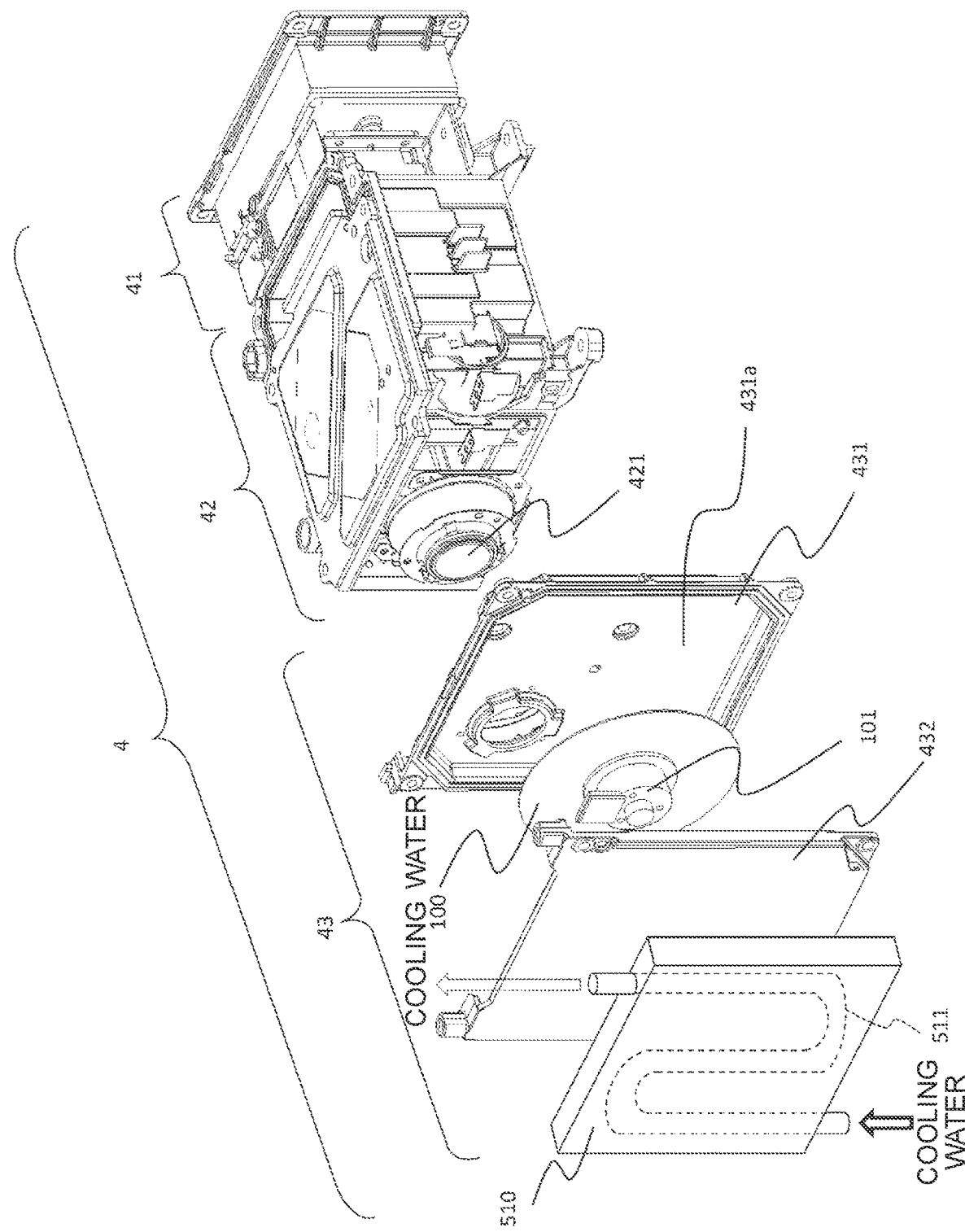
FIG. 10 is an exploded perspective view illustrating a state in which a water cooling jacket is mounted on a phosphor wheel housing.
Figure 11:
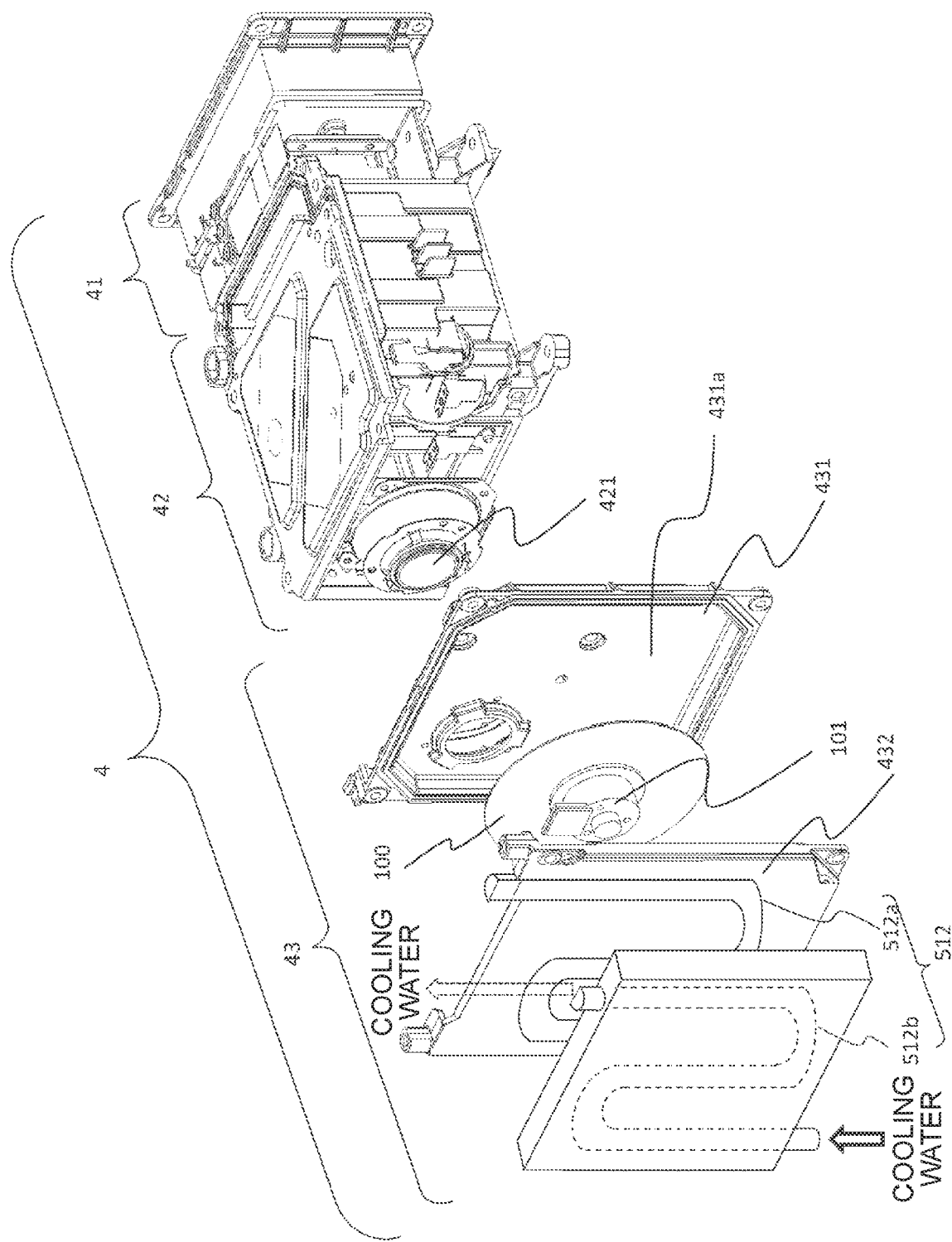
FIG. 11 is an exploded perspective view illustrating a state in which a water cooling jacket (with an in-wall pipe) is mounted on a phosphor wheel housing.

As a member for cooling the heat transferred to the outer surface of the phosphor wheel housing 43, a water cooling jacket 510 may be used instead of the fins 435. FIG. 10 and FIG. 11 are exploded perspective views illustrating a state in which the water cooling jacket 510 is mounted on the phosphor wheel housing 43.

In FIG. 10, the outer surface of the second housing part 432 is formed flat. Then, the water cooling jacket 510 accommodating an inner jacket pipe 511 serving as a circulation path of the cooling water is mounted on the second housing part 432.

In FIG. 11, an in-wall pipe 512 serving as a circulation path of the cooling water is formed in a wall surface of the second housing part 432. Furthermore, in the same manner as the one illustrated in FIG. 10, the outer surface of the second housing part 432 is formed flat, and the water cooling jacket 510 is attached to the second housing part 432.

As described above, as a cooling member of the second housing part 432, the water cooling jacket 510 may be externally attached to the phosphor wheel housing 43 instead of the fins 435. Moreover, the in-wall pipe 512 for circulating the cooling water may be accommodated in the second housing part 432.

Figure 12:
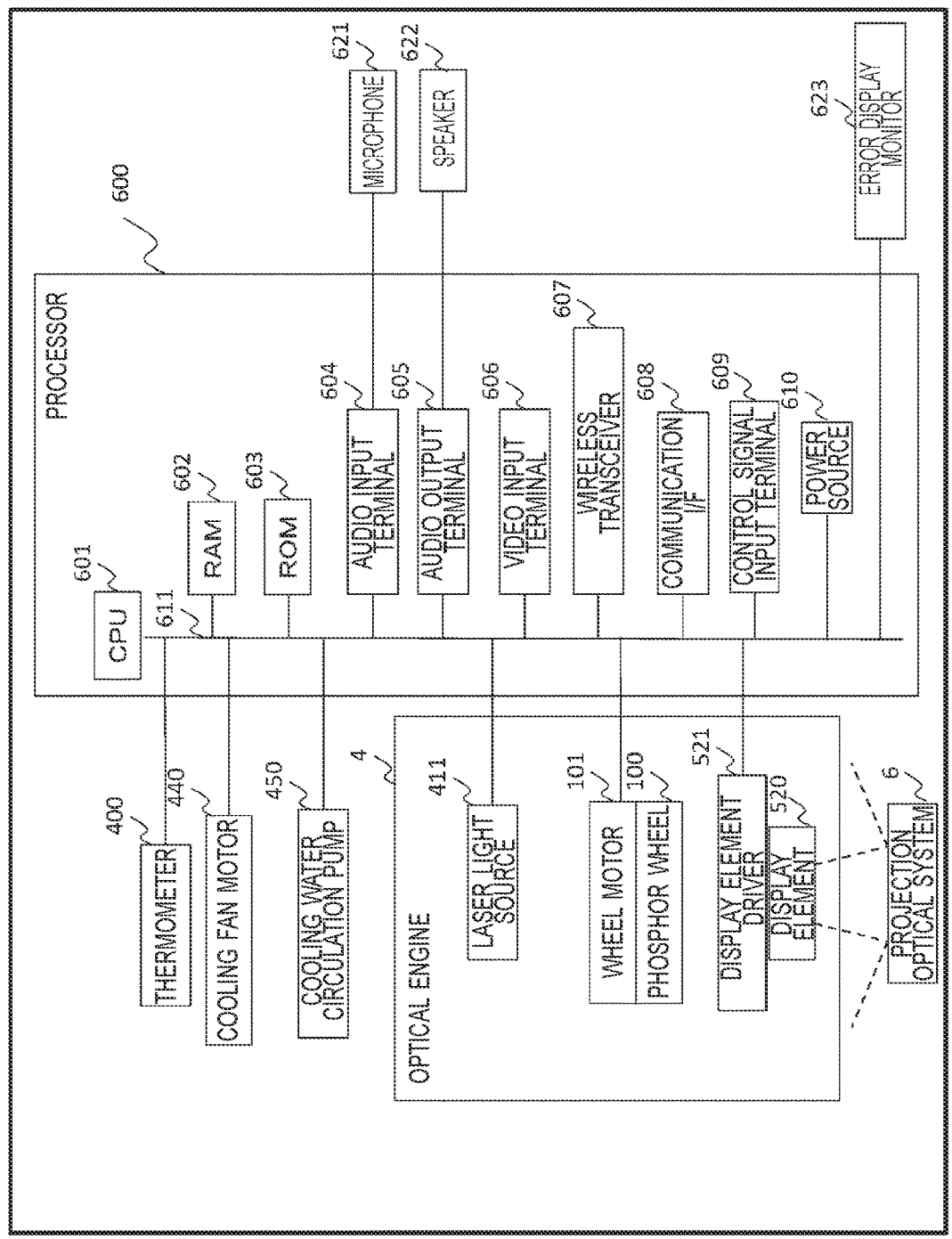
FIG. 12 is a functional block diagram of a projector.

FIG. 12 is a functional block diagram of the projector 1. As illustrated in FIG. 12, the projector 1 is mainly configured such that a thermometer 400 and a cooling fan motor 440 are electrically connected to a processor 600 which is one aspect of a computer. As illustrated in FIG. 10 and FIG. 11, in the aspect in which the water cooling jacket 510 is used for cooling the phosphor wheel housing 43, instead of the cooling fan motor 440, a cooling water circulation pump 450 configured to feed cooling water to the inner jacket pipe 511 and the in-wall pipe 512 is connected to the processor 600. When a path of the cooling water circulating in the inner jacket pipe 511 and a path of the cooling water circulating in the in-wall pipe 512 are different from each other, two sets of the cooling water circulation pump 450 are prepared and each one of them may be provided in the respective paths. Otherwise, a path of the cooling water fed from the single cooling water circulation pump 450 may be branched and fed into a path of the cooling water circulating in the inner jacket pipe 511 and a path of the cooling water circulating in the in-wall pipe 512.

The processor 600 includes a CPU (Central Processing Unit) 601, a RAM (Random Access Memory) 602, a ROM (Read Only Memory) 603, an audio input terminal 604 (e.g., an RCA pin terminal, a USB terminal), an audio output terminal 605 (e.g., an RCA pin terminal, a USB terminal), a video input terminal (e.g., an HDMI (registered trademark) terminal) 606, a wireless transmitter and receiver (hereinafter referred to as "wireless transceiver" 607 (a Bluetooth (registered trademark) device, an infrared communication device, a Wi-Fi wireless device), a communication I/F 608 (e.g., a LAN cable connector), a control signal input terminal 609 (e.g., an RS-232C cable connector), and a power source 610, which are connected to each other by a bus 611.

Furthermore, the bus 611 is electrically connected to the thermometer 400, the cooling fan motor 440 or the cooling water circulation pump 450, the laser light source 411, the wheel motor 101, and a display element driver 521 configured to drive a display element 520 (e.g., a liquid crystal panel) for displaying image information to be enlarged and projected. The flat cable 111 described above is used to connect the wheel motor 101 and the processor 600.

Figure 13:
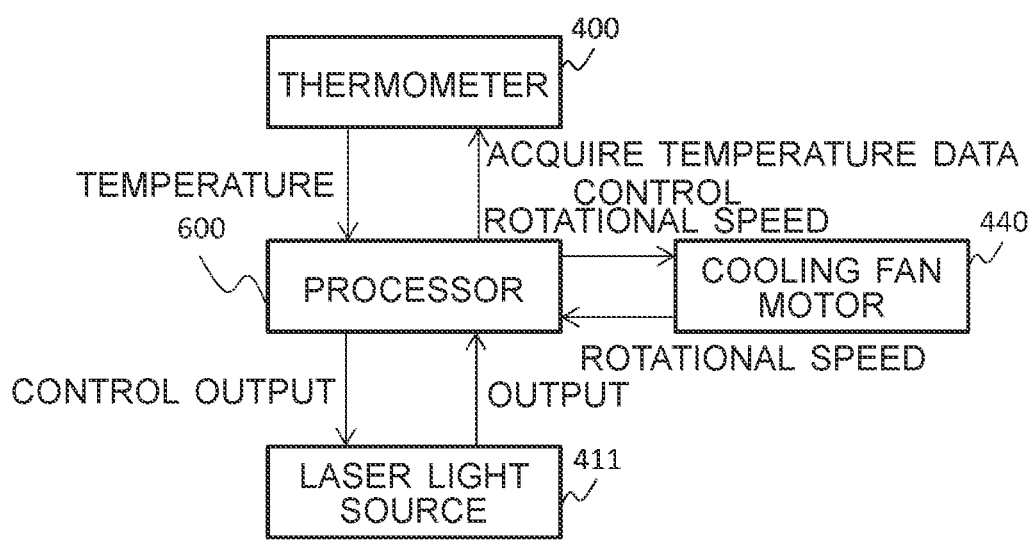
FIG. 13 illustrates an outline of operation of a projector.
Figure 14:
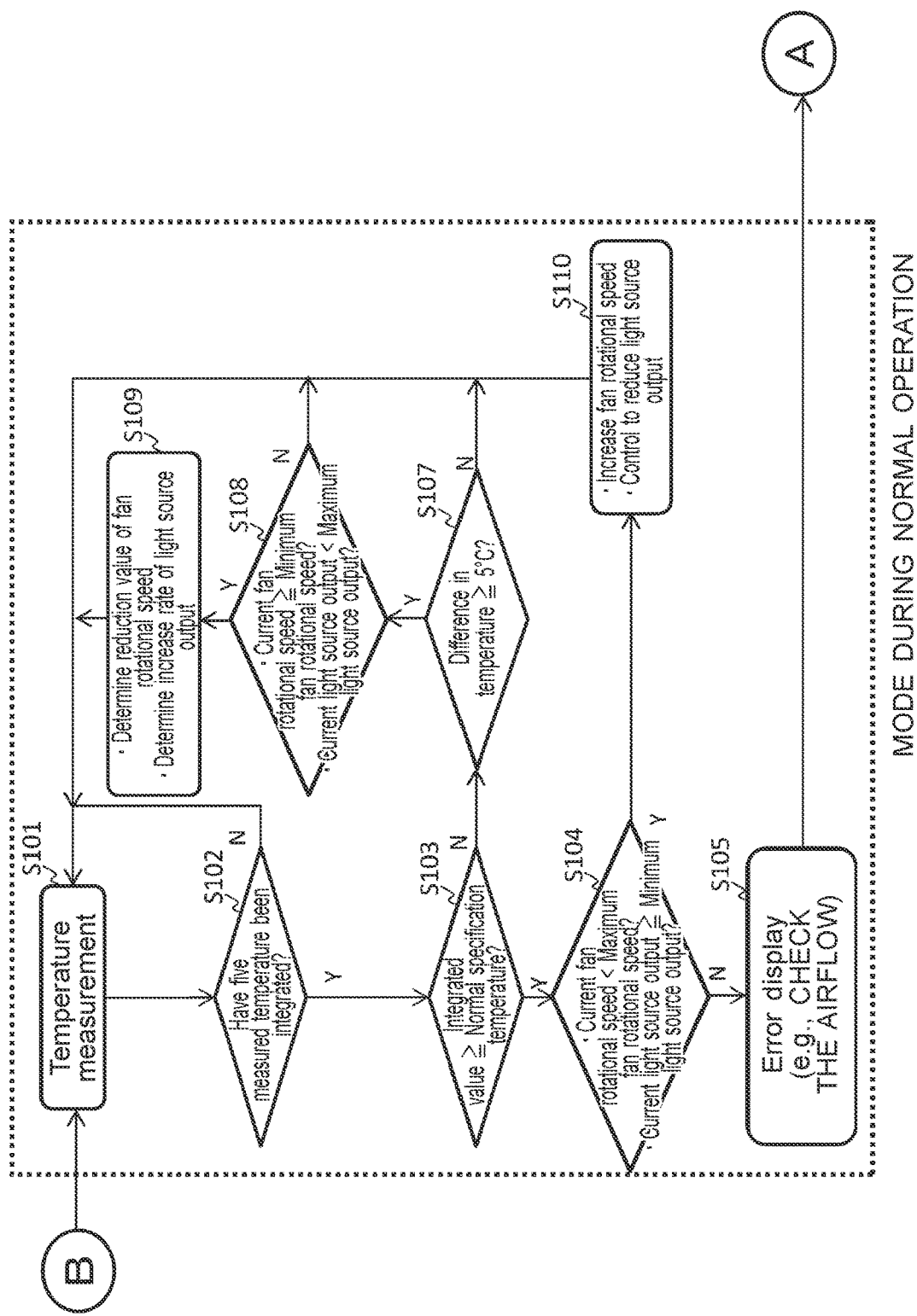
FIG. 14 illustrates a flowchart showing an operation mode of a projector, in particular, a normal operation mode.
Figure 15:
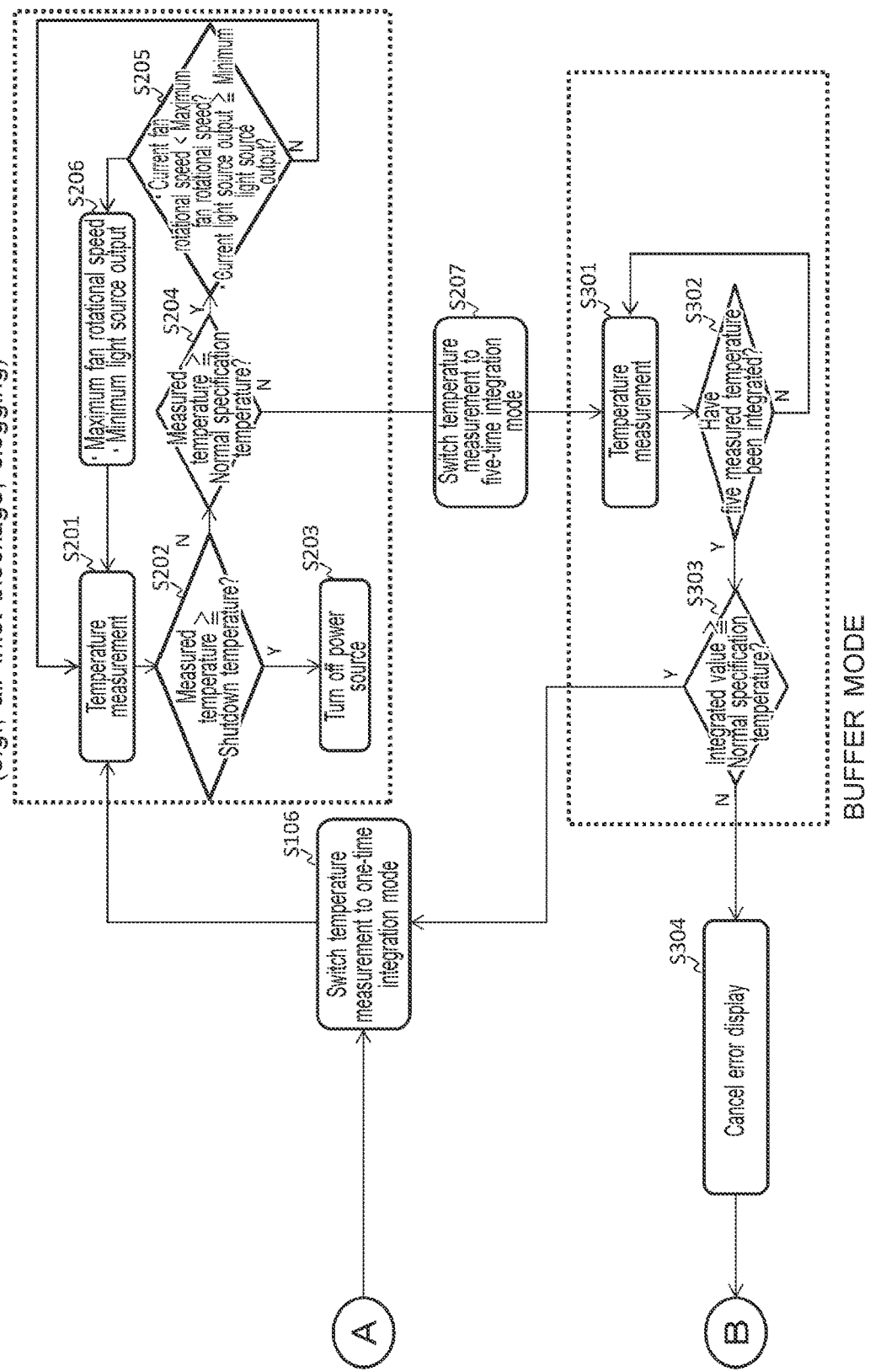
FIG. 15 illustrates a flowchart showing an operation mode of a projector, in particular, a mode during error occurrence and a buffer mode.

The projector 1 is configured to control the cooling operation by using measured temperature from the thermometer 400. With reference to FIG. 13, an outline of the cooling operation mentioned above will be described, and with reference to FIG. 14 and FIG. 15, the details thereof will be described. FIG. 13 illustrates an outline of the operation of the projector 1. FIG. 14 illustrates a flowchart showing an operation mode of the projector 1 executed by the processor 600, in particular, a normal operation mode. FIG. 15 illustrates a flowchart showing an operation mode of the projector 1 executed by the processor 600, in particular, a mode during error occurrence and a buffer mode.

As illustrated in FIG. 13, the processor 600 acquires the measured temperature from the thermometer 400. The processor 600 also acquires the current laser output from the laser light source 411, and the current rotational speed from the cooling fan motor 440. Then, the processor 600 determines by using the measured temperature whether the normal operation by the projector 1 can be performed, and as necessary, outputs a signal for controlling the laser output to the laser light source 411 and outputs a signal for controlling the rotational speed to the cooling fan motor 440. Hereinafter, the processing performed by the processor 600 will be described in detail.

The operation flows of the projector 1 illustrated in FIG. 14 and FIG. 15 start when the power source 610 of the projector 1 is turned on.

The thermometer 400 measures the temperature of the outer surface of the phosphor wheel housing 43 and outputs the measured temperature to the processor 600 (S101). The CPU 601 makes the RAM 602 temporarily store the measured temperature. The CPU 601 integrates the five measured temperature temporarily stored in the RAM 602 (S102/Yes). When the RAM 602 does not store the five measured temperature (S102/No), the CPU 601 makes the processing return to step S101.

When the CPU 601 determines that the integrated value of the five measured temperature is equal to or higher than the normal specification temperature stored in advance in the ROM 603 (S103/Yes), it then determines whether a condition for executing the normal operation mode is satisfied (S104).

In the present embodiment, it is assumed that when at least one of the following two conditions is positive, the condition for executing the normal operation mode is satisfied.

Current rotational speed of cooling fan motor 440<Maximum rotational speed of cooling fan (First Condition)

Current output of laser light source≥Minimum output of laser light source (Second Condition)

The CPU 601 acquires the current rotational speed of the cooling fan from the cooling fan motor 440 and compares the current rotational speed of the cooling fan with the maximum rotational speed of the cooling fan stored in advance in the ROM 603. Furthermore, the CPU 601 acquires the current laser light output from the laser light source 411 and compares the current laser light source output with the minimum laser light source output stored in advance in the ROM 603. As a result, when the first condition is negative and the second condition is also negative (S104/No), the CPU 601 makes an error display monitor 623 display an error (S105). Thereafter, the CPU 601 switches a mode of the temperature measurement to a one-time integration mode (S106) and shifts it to a mode during error occurrence, for example, a mode executed when an air inlet blockage or clogging occurs.

In step S103, when the CPU 601 determines that the integrated value of the five measured temperature is less than the normal specification temperature stored in advance in the ROM 603 (S103/No), it calculates the difference between the integrated value of the five measured temperature and the normal specification temperature to determine whether the difference in temperature is equal to or higher than 5° C. (S107). When the difference in temperature is equal to or higher than 5° C. (S107/Yes), the CPU 601 determines whether a condition for shifting the mode to an optimum operation mode is satisfied (S108). Here, an optimum operation state means an operation state in which energy is saved while the image quality of the projected image is bright.

In the present embodiment, it is assumed that when both of the following two conditions are satisfied, an adjustment condition to reach the optimum operation state is satisfied.

Current rotational speed of cooling fan motor 440≥Minimum value of rotational speed of cooling fan     (Third Condition)

Current output of laser light source<Maximum output value of laser light source     (Fourth Condition)

The CPU 601 acquires the current rotational speed of the cooling fan from the cooling fan motor 440 and compares the current rotational speed of the cooling fan with the minimum value of the rotational speed of the cooling fan stored in advance in the ROM 603. Furthermore, the CPU 601 acquires the current laser light output from the laser light source 411, and compares the current laser light source output with the maximum value of the laser light source output stored in advance in the ROM 603. As a result, when both the third condition and the fourth condition are satisfied (S108/Yes), the CPU 601 determines a reduction value of the rotational speed of the cooling fan and outputs it to the cooling fan motor 440 so as to reduce the rotational speed of the cooling fan. Furthermore, the CPU 601 determines an increase rate of the laser light source output and outputs it to the laser light source 411 so as to increase the laser light source output (S109). In this way, adjustment to reach the optimum operation state is executed. Thereafter, the CPU 601 makes the processing proceed to step S101. When the determination result in step S107 or step S108 is negative, the CPU 601 makes the processing also proceed to step S101.

In step S104, when the CPU 601 determines that the condition for executing the normal operation mode is satisfied (S104/Yes), it outputs an instruction for increasing the rotational speed of the cooling fan to the cooling fan motor 440. Furthermore, the CPU 601 issues an instruction for decreasing the laser light source output to the laser light source 411 (S110), and makes the processing return to step S101. In this way, the CPU 601 can perform the temperature adjustment processing to make the integrated value of the five measured temperature less than the normal specification temperature.

As illustrated in FIG. 15, in the mode during error occurrence, the thermometer 400 measures the temperature of the outer surface of the phosphor wheel housing 43, and outputs the measured temperature to the processor 600 (S201). When the CPU 601 determines that the measured temperature is equal to or higher than the shutdown temperature (temperature higher than the normal specification temperature) stored in advance in the ROM 603 (S202/Yes), it executes the shutdown processing and turns off the power source 610 (S203).

When the determination result in step S202 is negative and the CPU 601 determines that the measured temperature is equal to or higher than the normal specification temperature (S204/Yes), the CPU 601 determines whether an error display condition is satisfied (S205) in the same manner as step S108. When the CPU 601 determines that the error display condition is satisfied (S205/Yes), the CPU 601 outputs, to the cooling fan motor 440, an instruction for operating the cooling fan at the maximum rotational speed, and outputs, to the laser light source 411, an instruction for operating the laser light source at the minimum output (S206). Thereafter, the CPU 601 makes the processing return to step S201.

When the determination result in step S205 is negative, the CPU 601 also makes the processing return to step S201.

When the determination result in step S204 is negative, the CPU 601 switches the mode of temperature measurement to a five-time integration mode (S207), and shifts it to a buffer mode.

In the buffer mode, similarly to steps S101 to S103, the thermometer 400 measures the temperature of the outer surface of the phosphor wheel housing 43 (S301), and until the CPU 601 integrates the five measured temperature (S302/No), the thermometer 400 continues to measure the temperature (S301).

After the CPU 601 integrates the five measured temperature (S302/Yes), it determines whether the integrated value of the five measured temperature is equal to or higher than the normal specification temperature (S303). When the determination result is positive, the CPU 601 makes the processing return to step S106. When the determination result is negative, the CPU 601 cancels the error display (S304), and makes the processing return to step S101.

According to the present embodiment, since the laser light source 411 is installed outside the phosphor wheel housing 43, heat generated from the laser light source 411 is not accumulated inside the phosphor wheel housing 43. In this way, the heat source can be limited to the phosphor layer 100b, and accordingly, increase in the internal temperature of the phosphor wheel housing 43 can be mitigated.

Furthermore, compared with a case where the laser light source 411 is accommodated together with the phosphor wheel 100, the phosphor wheel housing 43 can be made smaller and the cost for manufacturing thereof can be reduced.

Furthermore, by sealing the internal space of the phosphor wheel housing 43, the correlation degree of the temperature change between the internal space and the outer surface of the phosphor wheel housing 43 is increased. Accordingly, it is possible to replace the monitoring of the temperature change in the internal space with the monitoring of the temperature change in the outer surface. As a result, the cooling operation can be performed at a more appropriate timing with respect to the temperature increase in the internal space.

The present embodiment does not limit the present invention. In the present embodiment, the phosphor wheel 100 is used as a base. Meanwhile, the present invention is not limited to the example using the disk-shaped base 100a, but can be applied to a housing that accommodates a wavelength conversion member using the base 100a formed by a plate like fixed body.

Furthermore, in the cooling operation flow illustrated in FIG. 13, FIG. 14, and FIG. 15, when the water cooling jacket 510 is used, the discharge amount of the cooling water circulation pump 450 may be controlled so as to be increased or decreased, instead of the control of the rotational speed of the cooling fan. In such a case, the same operation and effect as described above can be obtained by, in the processing of increasing the rotational speed of the cooling fan, replacing the term "increasing the rotational speed of the cooling fan" with the term "increasing the discharge amount", and in the processing of decreasing the rotational speed of the cooling fan, replacing the term "decreasing the rotational speed of the cooling fan" with the term "decreasing the discharge amount".

In the present embodiment, the projector is used as an example of the light source device using the phosphor member according to the present invention. Meanwhile, the present invention may be used for a lighting device such as a headlight.

Hereinafter, referring to FIGS. 18A to 18D, as another example of the heat absorbing portion, a heat absorbing portion in which at least one arc-shaped projection or arc-shaped groove and at least one radial line projection or radial line groove are combined will be described. FIGS. 18A to 18D illustrate an example of a heat absorbing portion formed on the inner surface (second facing surface 432a) of the phosphor wheel housing 43.

Figure 18A:
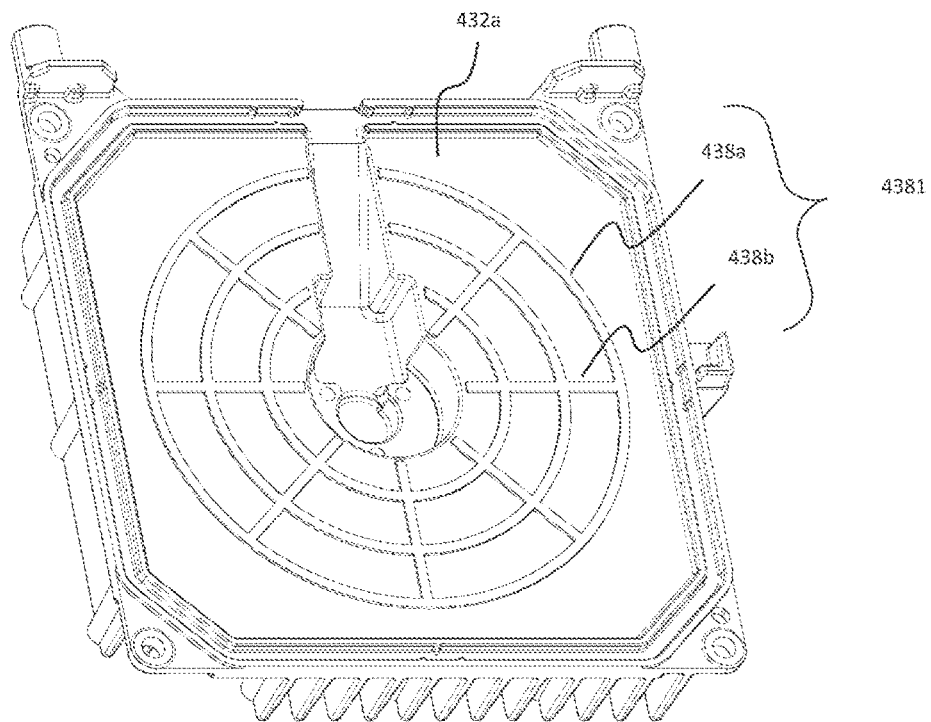
FIG. 18A illustrates an example of a heat absorbing portion formed on an inner surface of a phosphor wheel housing (by combining a concentric circular projection and a radial line projection).
Figure 18B:
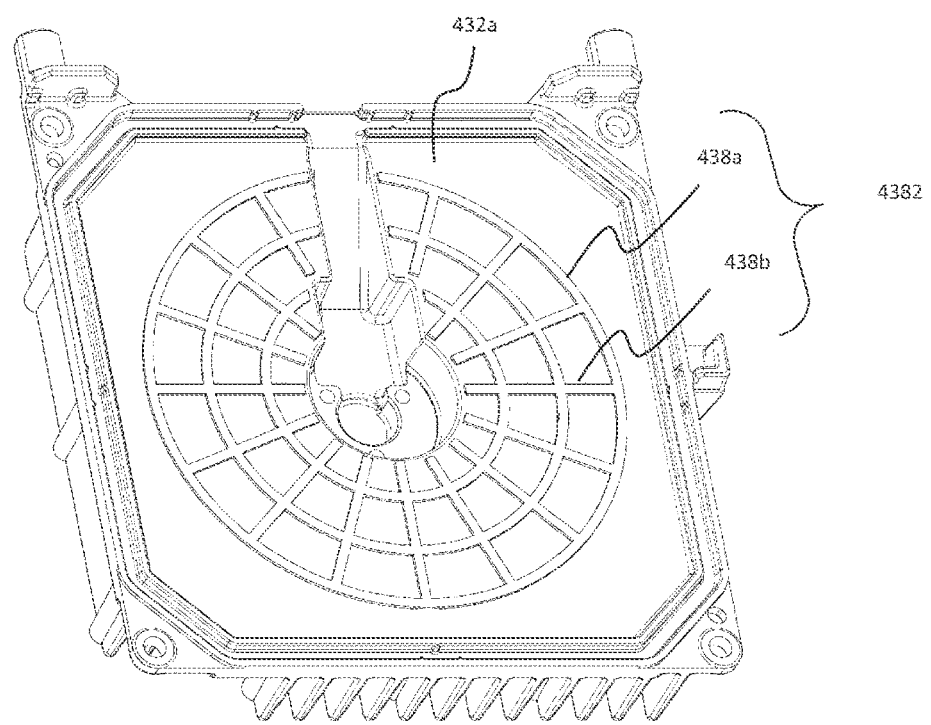
FIG. 18B illustrates an example of a heat absorbing portion formed on an inner surface of a phosphor wheel housing (by combining a concentric circular projection and a radial line projection).
Figure 18C:
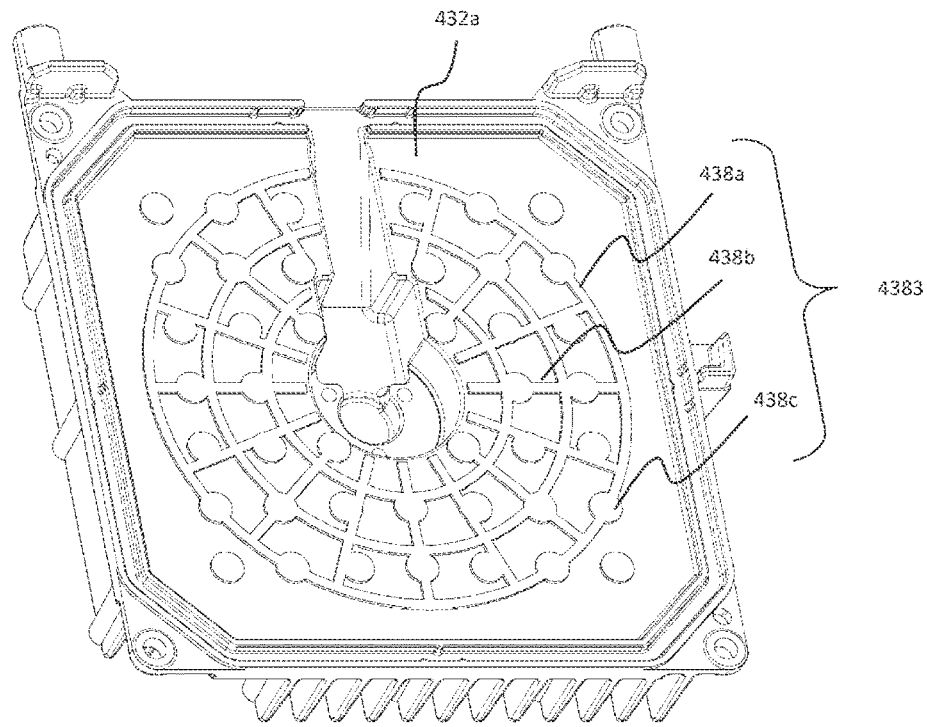
FIG. 18C illustrates an example of a heat absorbing portion formed on an inner surface of a phosphor wheel housing (by combining a concentric circular projection, a radial line projection, and circular projections).

Each of the heat absorbing portions 4381, 4382, 4383 of FIGS. 18A to 18C is formed on the second facing surface 432a of the second housing part 432 by combining a concentric circular projection 438a and a radial line projection 438b which are examples of the shape that follows the movement of particles in the internal space.

In the phosphor wheel housing 43, a rotation air flow is generated in accordance with the rotation of the phosphor wheel 100. Since the concentric circular projection 438a can enhance the following property to the rotation air flow, it is expected to improve the heat absorption performance.

Furthermore, as compared with a case where only the concentric circular projection 438a is formed on the second facing surface 432a, the surface area can be increased in a case where the radial line projection 438b is further formed thereon, thereby further improving the heat absorption performance.

Since the heat absorbing portion 4382 of FIG. 18B includes the larger number of radial line projections 438b than that of the heat absorbing portion 4381 of FIG. 18A, the surface area of the second facing surface 432a can be further increased, thereby improving the heat absorbing performance.

Since the heat absorbing portion 4383 of FIG. 18C is formed by further adding circular projections 438c to the heat absorbing portion 4382 of FIG. 18B, the surface area of the second facing surface 432a can be further increased as compared with the heat absorbing portion 4382 of FIG. 18B, thereby improving the heat absorbing performance.

Figure 18D:
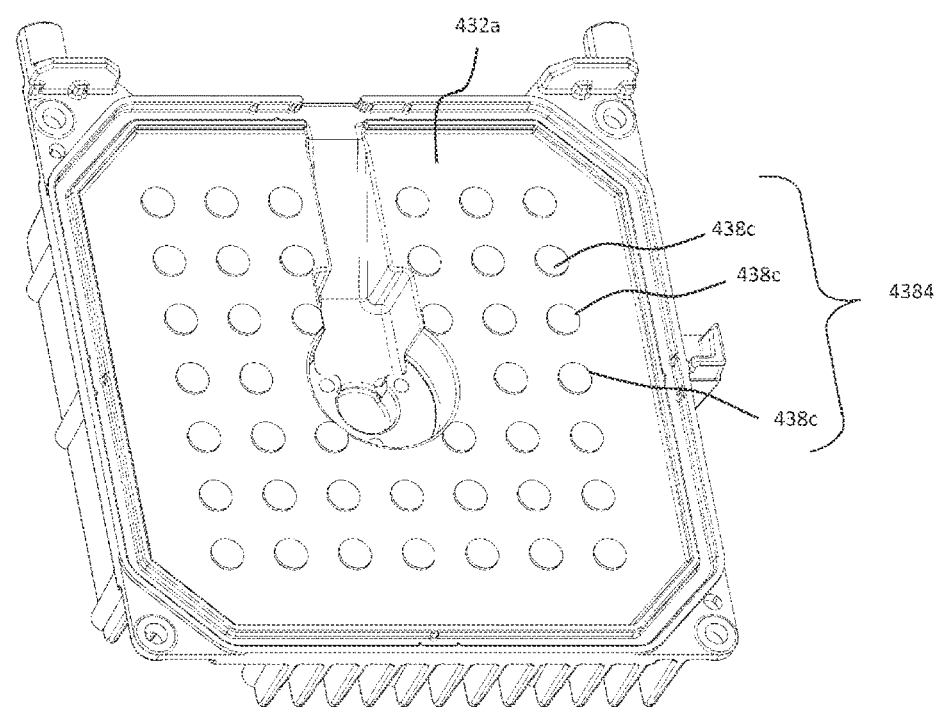
FIG. 18D illustrates an example of a heat absorbing portion formed on an inner surface of a phosphor wheel housing (by arranging circular projections in a matrix).

The heat absorbing portion 4384 of FIG. 18D includes the circular projections 438c arranged in a matrix on the second facing surface 432a, which is different from the heat absorbing portions 4381 to 4383 of FIGS. 18A to 18C. Since the second facing surface 432a is formed by the heat absorbing portion 4384, the surface area of the second facing surface 432a can be increased as compared with a case where the heat absorbing portion 4384 is not provided, thereby improving the heat absorbing performance.

According to the present embodiments, since the heat emitted from the wavelength conversion member can be effectively processed, the size in the casing unit and its manufacturing cost can be reduced.

The embodiments described above do not limit the present invention. For example, a concentric groove may be used instead of the concentric circular projection 438a in the examples described above. Furthermore, instead of a concentric circular shape, at least one projection or groove having the arc shape on the longer axis of an oval may be formed. Similarly, instead of the radial line projection 438b, a radial line groove may be used. In addition, instead of the circular projections 438c, circular recesses may be used. Still further, the heat absorbing portion may be formed by arbitrarily combining the projections, the grooves, and the recesses described above. Still further, other shape, for example, square shape may be used instead of the circular shape.

In the present embodiments, the disk-shaped phosphor wheel 100 is used as the base 100a. Meanwhile, the present invention is not limited to the example using the disk-shaped base 100a, but can be applied to a housing accommodating a wavelength conversion member using the base 100a formed by a plate-shaped fixed body.

In the present embodiment, the projector is used as an example of the light source device using the phosphor member according to the present invention. Meanwhile, the present invention may be used for a lighting device such as a headlight.

REFERENCE SIGNS LIST

1: projector
2: bottom case
3: heat pipe
4: optical engine
5: panel optical system
6: projection optical system
7: cooling duct
8: duct cover
9: upper case
41: laser module housing
42: color combining unit
43: phosphor wheel housing
100: phosphor wheel
100a: base
100b: phosphor layer
101: wheel motor
102: motor board
104: bolt
111: flat cable
400: thermometer
411: laser light source
421: converging lens
431: first housing part
431a: first facing surface
432: second housing part
432a: second facing surface
433: rubber packing
434: lens hole
435: fin
436: inner side fin
438: recess
440: cooling fan motor
450: cooling water circulation pump
500: projection
510: water cooling jacket
511: inner jacket pipe
512: in-wall pipe
520: display element
521: display element driver
600: processor
601: CPU
602: RAM 603: ROM
604: audio input terminal
605: audio output terminal
607: wireless transceiver
608: communication I/F
610: power source
611: bus
623: error display monitor

The invention claimed is:

1. A light source device comprising:
an excitation light source configured to generate excitation light;
a wavelength conversion member including a base and a phosphor layer which is provided on the base and configured to convert the excitation light into fluorescence; and
a converging optical system including a converging lens for converging the excitation light on the phosphor layer, wherein
the light source device further comprises a housing for accommodating the wavelength conversion member,
the excitation light source is provided outside the housing,
a first wall surface of the housing includes a lens hole into which the converging lens is inserted,
the converging lens which is inserted into the lens hole and a wall surface of the housing isolate an internal space of the housing from an outer space of the housing, and
a first distance, which is from a front surface of the wavelength conversion member provided with the phosphor layer to a first facing surface of the first wall surface facing the front surface, is larger than a second distance, which is from a back surface of the wavelength conversion member not provided with the phosphor layer to a second facing surface of the housing facing the back surface.

2. The light source device according to claim 1, wherein a cooling portion formed by a fin or a structure having concavo-convex shape is provided on an outer surface of the housing.

3. The light source device according to claim 1, wherein the second facing surface further includes a substantially polygonal pyramid shaped projection of which an apex is located on a same axis as the excitation light incident from the converging lens into the internal space of the housing.

4. The light source device according to claim 1, wherein a heat absorbing portion formed by a fin or a structure having concavo-convex shape is provided on an inner surface of the housing.

5. The light source device according to claim 4, wherein the wavelength conversion member is a phosphor wheel that includes the base and the phosphor layer,
the concavo-convex shape of the heat absorbing portion is spiral shape represented by an expression (6) in a two-axis orthogonal coordinate system included in the second facing surface of the housing facing the back surface of the wavelength conversion member not provided with the phosphor layer $$X' = \sqrt{r_0^2 + (r_0\omega t)^2} \cos(-\theta - \psi)$$
$$Y' = \sqrt{r_0^2 + (r_0\omega t)^2} \sin(-\theta - \psi)$$ (6)

where,
r0: initial radial position of particle among particles that can be present at each point of the phosphor wheel with trajectories that differ with each other depending on the initial position
ω: rotational angular velocity of the base of the phosphor wheel
θ: rotation angle of the phosphor wheel
when elapsed time is "t", θ=ωt
ψ: angle defined by tan ψ=r0ωt/r0 in stationary coordinate system when elapsed time is "t".

6. The light source device according to claim 4, wherein the heat absorbing portion includes a shape in which at least one of an arc-shaped projection or an arc-shaped groove and at least one of a radial line projection or a radial line groove are combined.

7. The light source device according to claim 6, wherein the arc-shaped projection is a concentric circular projection, and the arc-shaped groove is a concentric circular groove.

8. The light source device according to claim 7, wherein the heat absorbing portion is formed further in combination with at least one of a plurality of projections or a plurality of recesses.

9. The light source device according to claim 8, wherein the heat absorbing portion is formed by arranging at least one of a plurality of projections or a plurality of recesses in a matrix.

10. The light source device according to claim 4, wherein the housing includes a first housing part provided with the lens hole and a second housing part forming the internal space in combination with the first housing part, and the heat absorbing portion is formed on an inner surface of the second housing part.

11. The light source device according to claim 10, wherein a cooling member formed by a fin or concavo-convex shape is formed on an outer surface of the second housing part.

12. The light source device according to claim 1, wherein the housing further includes a thermometer, and the thermometer is installed in a state where a part or all part thereof is in contact with the outer surface of the housing.

13. A projector on which the light source device according to claim 12 is mounted, comprising:
a processor configured by a computer;
a cooling fan configured to send cooling air to the housing; and
a cooling fan motor configured to rotationally drive the cooling fan, wherein
the processor is connected to the thermometer, the cooling fan motor, and the excitation light source respectively,
the processor is configured to:
acquire measured temperature obtained by the thermometer which measures temperature of the outer surface of the housing;
determine whether the measured temperature is equal to or higher than a normal specification temperature which is used to determine whether to execute a normal operation of the projector; and
when the measured temperature is equal to or higher than the normal specification temperature, output, to the cooling fan motor, an instruction for increasing rotational speed of the cooling fan to predetermined maximum rotational speed of the cooling fan, and output, to the excitation light source, an instruction for reducing output of the excitation light source to predetermined minimum output of the excitation light source.

14. A lighting device on which the light source device according to claim 12 is mounted, comprising:
a processor configured by a computer;
a cooling fan configured to send cooling air to the housing; and
a cooling fan motor configured to rotationally drive the cooling fan, wherein the processor is connected to the thermometer, the cooling fan motor, and the excitation light source respectively, respectively, and
the processor is configured to:
acquire measured temperature obtained by the thermometer which measures temperature of the outer surface of the housing;
determine whether the measured temperature is equal to or higher than a normal specification temperature which is used to determine whether to execute a normal operation of the lighting device; and
when the measured temperature is equal to or higher than the normal specification temperature, output, to the cooling fan motor, an instruction for increasing rotational speed of the cooling fan to predetermined maximum rotational speed of the cooling fan, and output, to the excitation light source, an instruction for reducing output of the excitation light source to predetermined minimum output of the excitation light source.

15. The light source device according to claim 1, wherein the wavelength conversion member includes the base formed into a disk shape having a diameter D, and a motor configured to rotationally drive the base at a rotational angular velocity ω about a predetermined rotation axis, and when Reynolds numbers Re are represented by an expression (1), clearance ratios ε are represented by an expression (2), and average Nusselt numbers Nu of the wavelength conversion member are represented by an expression (3), in a graph in which functions f (Re, ε) including the Reynolds numbers Re and the clearance ratios ε are plotted on a horizontal axis while the average Nusselt numbers Nu are plotted on a vertical axis, a condition in which the second distance and the rotational angular velocity ω become equal to or greater than a half value of a peak value of the graph is satisfied $$\mathrm{Re} = \frac{D^2 \omega}{4\nu} \qquad (1)$$

$$\varepsilon = \frac{2a}{D} \qquad (2)$$

$$Nu = \frac{hD}{\lambda} \qquad (3)$$

where,
ν: coefficient of kinematic viscosity of air
h: coefficient of heat transfer on surface
λ: thermal conductivity of air.

16. The light source device according to claim 15, wherein
the average Nusselt numbers Nu and the functions f (Re, ε) are represented by an expression (4)

$$\left.\begin{array}{l} Nu = \frac{hD}{\lambda} = -2.0 \times 10^{-6} x^2 + 0.0147 x + 106 \\ x = f(\mathrm{Re}, \varepsilon) = \mathrm{Re} \times \varepsilon \end{array}\right\}. \qquad (4)$$

17. The light source device according to claim 1, wherein the second distance is equal to or less than 5.0 mm.

18. The light source device according to claim 1, wherein a water cooling jacket configured to circulate cooling water is further mounted on an outer surface of the housing.

19. The light source device according to claim 1, wherein an in-wall pipe serving as a circulation path of cooling water is provided in the wall surface of the housing.

* * * * *